(12) United States Patent
Spratt et al.

(10) Patent No.: US 10,969,607 B2
(45) Date of Patent: Apr. 6, 2021

(54) METHOD FOR DETERMINING AN IMPROVED DESIGN FOR A PROGRESSIVE LENS

(71) Applicants: Carl Zeiss Vision International GmbH, Aalen (DE); Ray Steven Spratt, Petaluma, CA (US)

(72) Inventors: Ray Steven Spratt, Petaluma, CA (US); Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/259,912

(22) Filed: Jan. 28, 2019

(65) Prior Publication Data

US 2019/0171035 A1 Jun. 6, 2019

Related U.S. Application Data

(63) Continuation of application No. PCT/US2017/043971, filed on Jul. 26, 2017, which is a continuation-in-part of application No. PCT/US2016/044267, filed on Jul. 27, 2016.

(51) Int. Cl.
*G02C 7/02* (2006.01)
*G02C 7/06* (2006.01)

(52) U.S. Cl.
CPC .............. *G02C 7/027* (2013.01); *G02C 7/028* (2013.01); *G02C 7/061* (2013.01); *G02C 7/063* (2013.01); *G02C 2202/22* (2013.01)

(58) Field of Classification Search
CPC ........ G02C 7/027; G02C 7/063; G02C 7/028; G02C 2202/22; G02C 7/06; G02C 7/061; G02C 7/065; G02C 7/066; G02C 7/068

USPC ..................................................... 351/159.42
See application file for complete search history.

(56) References Cited

U.S. PATENT DOCUMENTS

| | | | |
|---|---|---|---|
| 6,089,713 A | 7/2000 | Hof et al. | |
| 6,382,795 B1 | 5/2002 | Lai | |
| 7,063,421 B2 | 6/2006 | Wehner et al. | |
| 7,556,381 B2 | 7/2009 | Kelch et al. | |
| 7,604,350 B2 | 10/2009 | Dursteler Lopez et al. | |
| 7,857,451 B2 | 12/2010 | Thibos et al. | |
| 8,205,987 B2 | 6/2012 | Meister et al. | |
| 8,757,800 B2 | 6/2014 | Esser et al. | |

(Continued)

FOREIGN PATENT DOCUMENTS

| | | |
|---|---|---|
| CN | 101866062 A | 10/2010 |
| EP | 0 857 993 A2 | 8/1998 |

(Continued)

OTHER PUBLICATIONS

International Preliminary Report on Patentability dated Jan. 29, 2019 in international patent application PCT/US2016/044267.

(Continued)

*Primary Examiner* — William R Alexander
*Assistant Examiner* — Henry A Duong
(74) *Attorney, Agent, or Firm* — Walter Ottesen, P.A.

(57) ABSTRACT

The current disclosure is directed to a method for determining an improved design for a progressive spectacle lens. Further, there are provided a method for manufacturing a progressive spectacle lens, a system for determining an improved design for a progressive spectacle lens, a non-transitory computer program and a progressive spectacle lens.

21 Claims, 13 Drawing Sheets

(56) References Cited

U.S. PATENT DOCUMENTS

| | | | |
|---|---|---|---|
| 8,985,767 | B2 | 3/2015 | Spratt et al. |
| 8,992,013 | B2 | 3/2015 | Dillon et al. |
| 9,360,684 | B2 | 6/2016 | Contet et al. |
| 2005/0104240 | A1 | 5/2005 | Jethmalani et al. |
| 2005/0110946 | A1 | 5/2005 | Youssefi et al. |
| 2005/0270482 | A1 | 12/2005 | Fisher et al. |
| 2008/0100800 | A1 | 5/2008 | Guillen et al. |
| 2008/0231802 | A2 | 9/2008 | Cabeza et al. |
| 2009/0015787 | A1 | 1/2009 | Guillen et al. |
| 2011/0255052 | A1* | 10/2011 | Meister .......... G02C 7/024 351/159.74 |
| 2012/0016645 | A1* | 1/2012 | Altheimer .......... G02C 7/025 703/2 |
| 2012/0069297 | A1 | 3/2012 | Cabeza et al. |
| 2013/0107204 | A1* | 5/2013 | Spratt .......... G02C 7/027 351/159.74 |
| 2015/0124214 | A1 | 5/2015 | Contet et al. |

FOREIGN PATENT DOCUMENTS

| | | |
|---|---|---|
| EP | 1 744 203 A1 | 1/2007 |
| JP | 2006502428 A | 1/2006 |
| JP | 2014505908 A | 3/2014 |
| WO | 03/092485 A1 | 11/2003 |
| WO | 2010/142888 A1 | 12/2010 |

OTHER PUBLICATIONS

Office action of the Canadian Patent Office dated Mar. 11, 2019 in corresponding Canadian application 3,031,672.

Blendowski, R. et al., "An Analytical Model Describing Aberrations in the Progression Corridor of Progressive Addition Lenses", Optometry and Vision Science, vol. 83, No. 9, Sep. 2006, pp. 666 to 671.

Brooks, C. et al., "System for Ophthalmic Dispensing Third Edition", Butterworth-Heinemann, Elsevier, copyright 2007, pp. 425 to 429.

Dai, G. et al., "Wavefront propagation from one plane to another with the use of Zernike polynomials and Taylor monomials", Applied Optics, vol. 48, No. 3, Jan. 20, 2009, pp. 477 to 488.

DIN EN ISO 13666: 2012 of the DIN Deutschen Institut fuer Normung, e.V., Oct. 2013, pp. 1 to 110.

Gross, H. et al, "Handbook of Optical Systems", vol. 3, Wiley-VCH Publishing, Weinheim, 2007, in particular in vol. 3—Aberration Theory and Correction of Optical Systems, in particular its chapters 29 "Aberrations", 32 "Principles of Optimization" and 33 "Optimization process", pp. 1 to 71, 298 to 369, 371 and 372.

Mahajan, V., "Optical Imaging and Aberrations, Part 1, Ray Geometrical Optics", SPIE Optical Engineering Press, Bellingham, Washington, 1998, pp. 158 to 163.

Shannon, R.R., "The Art and Science of Optical Design", Cambridge University Press, 1997, in particular its Thapters 3 "Aberrations" and 5 "Design optimization", pp. 164 to 264 and 334 to 355.

DIN EN ISO 13666: 2012 of the DIN Deutschen Institut fuer Normung, e.V., "Ophthalmic optics—Spectacle lenses," Oct. 2013, pp. 1 to 110.

International Search Report of the international searching authority dated Nov. 6, 2017 in international patent application PCT/US2017/043971 on which the claim of priority is based.

International Search Report of the international searching authority dated Apr. 12, 2017 in international patent application PCT/US2016/044267 on which the claim of priority is based.

International Search Report and Written Opinion of the international searching authority dated Apr. 12, 2017 in international patent application PCT/US2016/044267 on which the claim of priority is based.

International Search Report and Written Opinion of the international searching authority dated Nov. 6, 2017 in international patent application PCT/US2017/043971 on which the claim of priority is based.

International Preliminary Report on Patentability of the international searching authority dated Jul. 11, 2018 in international patent application PCT/US2017/043971 on which the claim of priority is based.

English translation of the Office action from Japanese Patent Office dated Jun. 10, 2019, in corresponding patent application JP 2019-504057.

English translation and Office action of the Chinese Patent Office dated Jun. 3, 2019 in corresponding Chinese patent application 2017 80046439.X.

Office action from the Indian Patent Office dated Nov. 18, 2020, in corresponding Indian patent application 201917003414.

\* cited by examiner

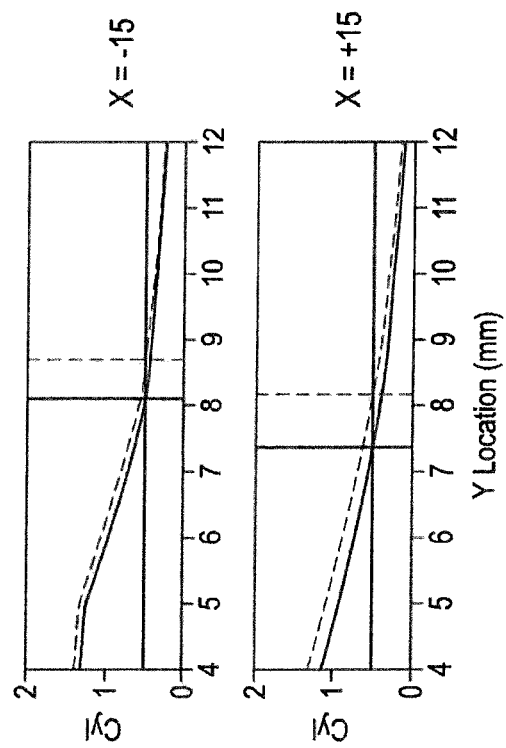
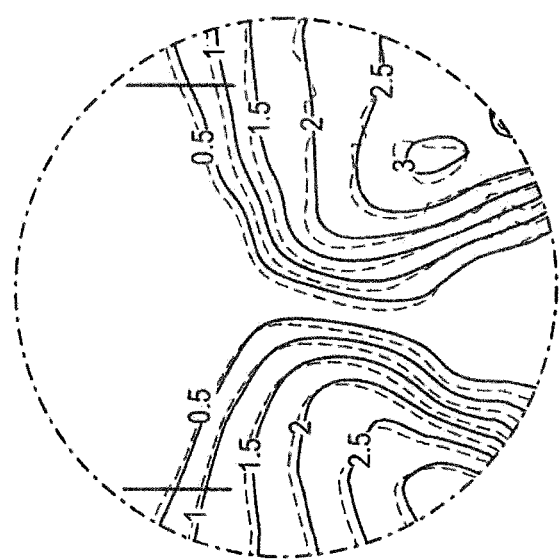
Fig. 4

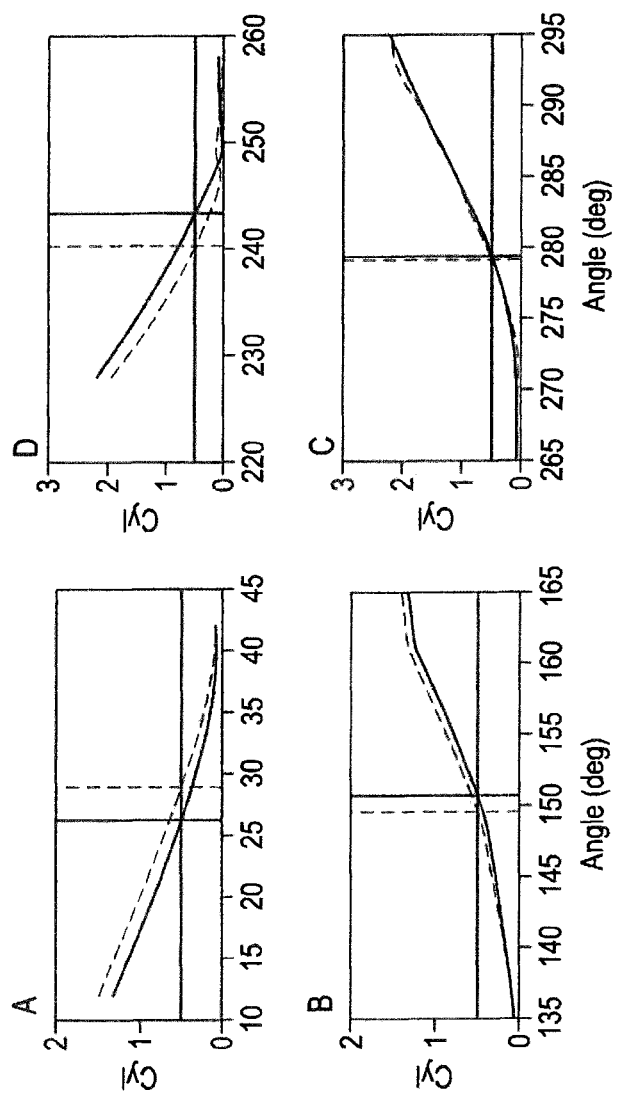
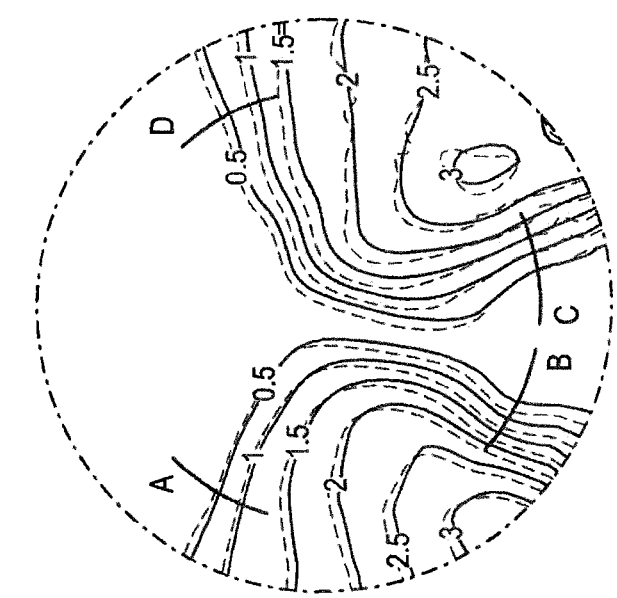
Fig. 5

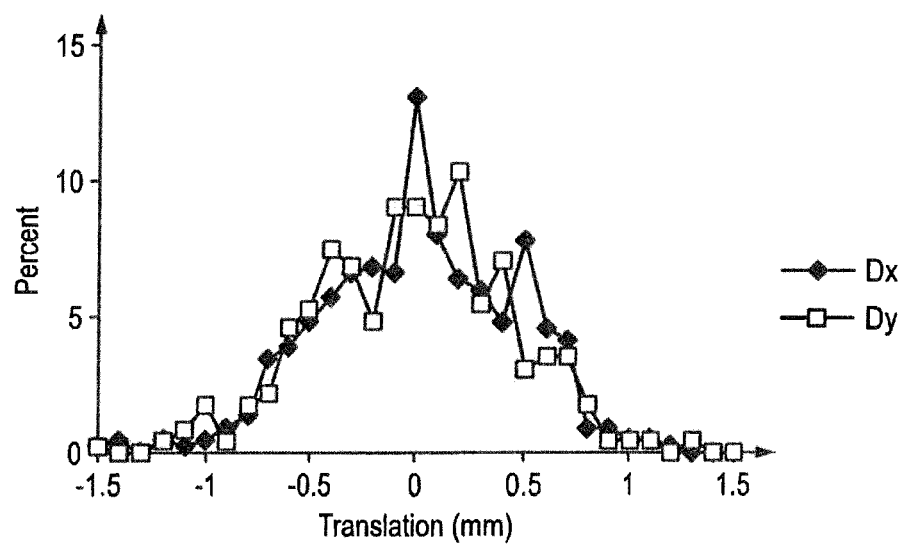
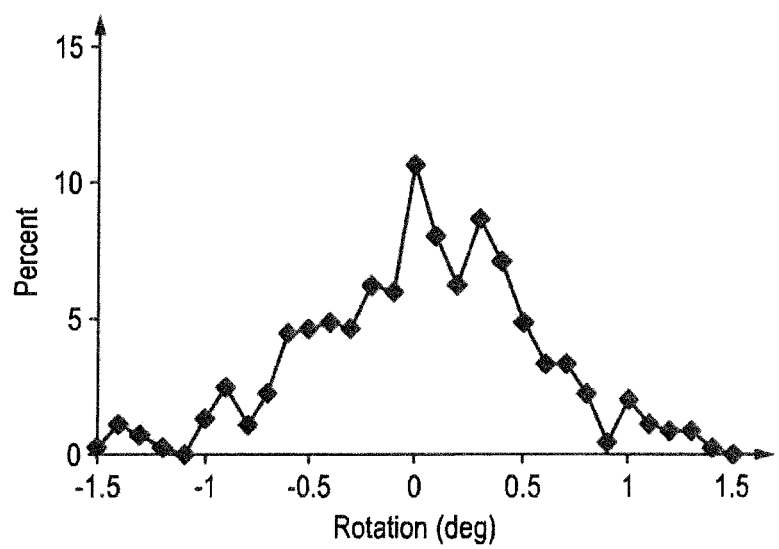
Fig. 6

METHOD FOR DETERMINING AN IMPROVED DESIGN FOR A PROGRESSIVE LENS

CROSS REFERENCE TO RELATED APPLICATIONS

This application is a continuation application of international patent application PCT/US2017/043971, filed Jul. 26, 2017, designating the United States which, in turn, is a continuation-in-part application of international patent application PCT/US2016/044267, filed Jul. 27, 2016, and the entire content of both applications is incorporated herein by reference.

FIELD OF THE INVENTION

The current invention relates to a method for determining a design, in particular an improved design, for a progressive spectacle lens. In particular, the method can be a computer-implemented method. Further, the current invention is related to a method for manufacturing a progressive spectacle lens. Even further, the current invention is directed to a system for determining a design for a progressive spectacle lens, in particular an improved design for a progressive spectacle lens. Even further, there is provided a computer program, in particular a non-transitory computer program product. Even further, there is provided a progressive spectacle lens manufactured according to the method for manufacturing.

BACKGROUND OF THE INVENTION

In the context of the present disclosure a plurality of terms are used which shall be defined as follows:

Design for a progressive spectacle lens means in the context of the present description a mathematical representation of the overall surface geometry of the progressive spectacle lens, i.e. a mathematical representation of the geometries, relative position and relative orientation of the front surface (i.e. that surface of the spectacle lens intended to be fitted away from the eye) and the back surface (i.e. that surface of the spectacle lens intended to be fitted nearer to the eye) of the progressive spectacle lens as well as the refractive index of the progressive spectacle lens. In particular, the design may comprise the thickness of the lens at least at one point. Preferably the design may comprise the thickness distribution across the entire spectacle lens. The refractive index of the lens may comprise the refractive index, in particular the refractive index distribution, of the material of the spectacle lens. The refractive index, in particular the refractive index distribution, may be given for a reference wavelength, i.e. a reference design wavelength. Furthermore, the design may comprise fitting parameters, for example inset, cornea vertex distance, pantoscopic angle, wrap angle or face form angle, far design reference point and/or near design reference point, which provide for the positioning of the front and back surfaces relative to the eye. Preferably, the geometry of the progressive spectacle lens is given by a coordinate system having its origin at the center of rotation of the eye.

Design optical power distribution of the progressive spectacle lens means in the context of the present description the distribution of optical power across the progressive spectacle lens (with the above design) as perceived by the wearer's eye when looking through the progressive spectacle lens assuming a predetermined position and orientation of the progressive spectacle lens in front of the wearer's eye as well as a predetermined model for the distances and positions in space for a plurality of objects viewed by the wearer in front of the wearer's eye. In case the design optical power distribution in the context of the present description is called an initial design optical power distribution the lower-order aberrations (LOAs) of the wearer's eye and the lower-order aberrations (LOAs) of the progressive spectacle lens are taken into consideration, only. Taking into consideration the lower-order aberrations (LOAs) of the wearer's eye, only, means that the initial design optical power distribution of the progressive spectacle lens is based on the assumption that the wearer's eye is free of higher-order aberrations (HOAs).

Aberrations are the result of differences in optical path length between an ideal spherical wavefront that would result in a perfect focus through an optical system, e.g. in the present case a spectacle lens and the eye of the wearer of the spectacle lens. Aberrations are often categorized by their radial order, which indicates the dependence of the aberration on pupil size or lens aperture size.

The optical components of the human eye suffer from both "lower-order" and "higher-order" aberrations. The lower-order aberrations of interest to the correction of vision are actually a subset of the lower-order aberrations, referred to as the "second-order" aberrations. Second-order aberrations vary as a function of the square of the distance of the center of the pupil or the aperture. These aberrations are typically corrected with an eyeglass prescription that includes a spherical power component, a cylindrical (or astigmatic) power component and an axis component that describes the orientation of the cylindrical power. Lower-order aberrations mean in the context of the present description first- and second-order aberrations.

Higher-order aberrations mean in the context of the present description wavefront aberrations that vary as a cubic or higher order function of the distance from the center of the eye's pupil or (spectacle) lens' aperture.

There are a plurality of possibilities to describe the lower-order and higher-order aberrations using different series expansions (see e.g. R. R. Shannon, The Art and Science of Optical Design, Cambridge University Press, New York, 1997, pp. 164-355; V. N. Mahajan, Optical Imaging and Aberrations, Part I, Ray Geometrical Optics, SPIE Optical Engineering Press, Bellingham Wash. U.S.A., 1998, pp. 158-163; U.S. Pat. No. 8,757,800 B2; U.S. 2011/0255052 A1). In particular, a Taylor series expansion (see e.g. R. Blendowske et al, An Analytical Model Describing Aberrations in the Progression Corridor of Progressive Addition Lenses, in Optometry and Vision Science, Vol. 83, No. 9, September 2006, pp. 666-671; U.S. Pat. Nos. 8,985,767 B2; 8,757,800 B2; U.S. 2011/0255052 A1), Zernike polynomials (see e.g. R. Blendowske et al, An Analytical Model Describing Aberrations in the Progression Corridor of Progressive Addition Lenses, in Optometry and Vision Science, Vol. 83, No. 9, September 2006, pp. 666-671; V. N. Mahajan, Optical Imaging and Aberrations, Part I, Ray Geometrical Optics, SPIE Optical Engineering Press, Bellingham Wash. U.S.A., 1998, pp. 158-163; Dai et al., Wavefront Propagation from one Plane to another with the use of Zernike Polynomials and Taylor Polynomials, Applied Optics, Optical Society of America, Vol. 48, Issue 3, 2009, pp. 477-488; Gross et al., Handbook of Optical Systems, Vol. 1 to 6, Wiley VCH Publishing, Weinheim, 2007, ISBN: 978-3-527-40382-0; U.S. Pat. Nos. 8,985,767 B2; 8,757,800 B2; 8,992,013 B2; U.S. 2011/0255052 A1), Chebyshev polynomials (US 2011/0255052 A1) or a wavefront defined by Seidel aberrations (U.S. Pat. No. 8,757,800 B2; U.S. 2011/0255052 A1) may be used to describe aberrations (see e.g. R. R. Shannon, The Art and Science of Optical Design, Cambridge University Press, New York, 1997, pp. 224-225).

The progressive spectacle lens can either be a prescription progressive spectacle lens, having been designed and fabricated based on a previously acquired prescription from an individual wearer, or a stock progressive spectacle lens, having been designed and fabricated based on assumptions related to a standard or average wearer, and the respective design can be a prescription progressive spectacle lens design or a stock progressive spectacle lens design corresponding to the second-order correction for the aberrations of the eye of the wearer.

Optical power means in the context of the present description the capacity of a spectacle lens or optical surface of the spectacle lens to change the curvature or direction of incident wavefronts by refraction as is e.g. defined in sec. 4.10 of DIN EN ISO:2013-10. In case of reference to a specific optical surface of the spectacle lens, the term surface optical power is used. The optical power of the progressive spectacle lens may be expressed in terms of prismatic power and respective base, spherical power, astigmatic power and respective axis or equivalents thereof. The term optical power is synonymously used to the term "as-worn" power as defined in sec. 9.11 of DIN EN ISO 13666:2013-10.

Taking into consideration the lower-order aberrations (LOAs) of the progressive spectacle lens, only, means in the context of the present description that the distribution of the spherical power and the distribution of the astigmatic power and respective axis (or equivalents thereof) are taken into consideration, only, when designing the progressive spectacle lens.

Perceived optical power distribution means in the context of the present description the distribution of optical power across the progressive spectacle lens as perceived by the wearer's eye when looking through the progressive spectacle lens assuming a predetermined position and orientation of the progressive spectacle lens in front of the wearer's eye as well as a predetermined model for the distances and positions in space of a plurality of objects viewed by the wearer in front of the wearer's eye and taking into consideration the lower-order aberrations (LOAs) and the higher-order aberrations (HOAs) of the wearer's eye and the lower-order aberrations (LOAs) and the higher-order aberrations (HOAs) of the progressive spectacle lens. Taking into consideration the lower-order aberrations (LOAs) and the higher-order aberrations (HOAs) of the wearer's eye means that the optical power distribution of the progressive spectacle lens is based on the assumption that the wearer's eye is not free of higher-order aberrations (HOAs). The optical power related to the perceived optical power distribution of the progressive spectacle lens is still expressed in the same terms as used in relation to the design optical power distribution, namely in terms of prism and base, spherical power, astigmatic power and respective axis or equivalents thereof (see e.g. sec. 9.11 of DIN EN ISO 13666:2013-10). Ways of calculation of these values, namely prism and base, spherical power, astigmatic power and respective axis or equivalents thereof, can be found in U.S. 2008/0231802 A2, in particular paragraphs [0062] and [0063].

The terms design optical power distribution and perceived optical power distribution in the context of the present description do not only comprise the absolute values indicated above but also comprise design optical power error distribution and perceived optical power error distribution, respectively, i.e. the deviations from values being required for full correction. In particular the examples described in detail in the following referring to the attached Figures relate to astigmatic error distributions, only.

Design optical power error distribution for a progressive spectacle lens means in the context of the present description the distribution of optical power errors across the progressive spectacle lens as perceived by the predetermined wearer's eye when looking through the progressive spectacle lens assuming a predetermined position and orientation of the spectacle lens in front of the wearer's eye as well as a predetermined model for the distance of an object viewed by the wearer in front of the wearer's eye. In particular, the optical power errors are the spherical error and the distribution of the astigmatic power error and respective axis or equivalents thereof.

While it is customary to determine the refractive errors of the human eye by relying on the subjective refraction of the patient under examination when presenting to him a plurality of optotypes through lenses of different refractive power, so-called subjective refraction or manifest refraction, the possibility of measuring the refractive errors of the eye has now been available for several years, so-called objective refraction. Moreover, it is possible to measure the refractive power of the eye over the entire pupil. The measurable errors include for example spherical aberration, coma, trefoil error, higher orders of spherical aberration, etc. In certain implementations, the objective refraction method is based on determining the wavefront of a propagating light bundle. The functional principal of a wavefront refractor is described in document U.S. Pat. No. 6,382,795 B1, which is herein incorporated by reference and for which features protection may be sought, and also includes a synopsis of a plurality of different variants.

The information gained from a wavefront refractor can be used in the development of improved vision aids or improved eyesight correction methods. A well-known example for an eyesight correction method is the procedure of wavefront-guided refractive surgery. In this procedure, a volume of any desired geometry is removed from the surface of the cornea in order to correct refractive errors, including those of a higher order. In general, in order to determine an eyeglass prescription for visual aids, an eye care professional determines several parameters. In the case of spectacle lenses, for example, the most relevant ones are: refractive values, usually given in form of sphere, cylinder and axis; fitting parameters, such as pupil distance, fitting height, pantoscopic angle and others; and near vision addition, for example, in case of progressive lenses. For contact lenses, the set of parameters usually includes at least the refractive values, similar to spectacle lenses, and corneal curvature.

Document WO 2010/142888 A1 shows a spectacle lens generally adapted for correcting an ocular defect.

Document U.S. 2005/0104240 A1 shows a method for manufacturing an optical lens that is configured to correct high order aberrations. Document U.S. Pat. No. 7,063,421 B2 shows spectacle lens with small high order aberrations. Document U.S. Pat. No. 8,992,013 B2 shows a method of designing a progressive additional lens. Document U.S. 2005/0270482 A1 shows a further method of designing a progressive lens. Document U.S. 2011/0255052 A1 shows a method for optimizing a spectacle lens for the wavefront aberrations of an eye and lens.

Further, document U.S. Pat. No. 8,985,767 B2 shows a method for designing a progressive lens. The method includes obtaining a wavefront measurement of an eye, determining an initial design for the progressive lens based on the wavefront measurement, determining information about how changes in one or more high order aberrations of the eye affect a second order correction for the aberrations of the eye based on information derived from the wavefront measurement, modifying the initial design of the progressive lens to provide a final progressive lens design, and outputting the final lens design.

Progressive lenses are designed to provide the wearer with a specific distribution of optical powers, including a distribution of an astigmatic error that cannot be fully avoided. Typically, these designs effectively assume that the wearer's eyes do not have any aberrations higher than second order. However, the optical powers, as well as the astigmatic error, perceived by the wearer are modified by higher order aberrations, or HOA, in each individual wearer's eyes. A solution is, for example, described in U.S. Pat. No. 8,985,767 B2 which modifies a target power distribution and relies on a weighted optimization to produce an improved lens. However, the new target power distribution might not be physically achievable. Hence, the modification of the original lens or the initial design will depend heavily on specific distribution of weights used in the optimization and might not automatically reflect the most critical aspects of the design.

Document U.S. 2011/0255052 A1 shows a method for designing an ophthalmic lens element, the method comprising the steps of determining a wavefront aberration of an eye in a reference plane, wherein the wavefront aberration of the eye can be described by a first series of polynomials of ascending order up to a first specific order and corresponding first coefficients; and determining a first vision correction of a second specific order to obtain an adapted ophthalmic lens element; determining at least one specified point over an aperture of the adapted ophthalmic lens element; determining a high-order wavefront aberration in the reference plane for each specified point of the adapted ophthalmic lens element, wherein the high-order wavefront aberration can be described by a third series of polynomials of ascending order above the second specific order up to and including the first specific order and corresponding third coefficients; determining a second vision correction of the second specific order for each of the specified points to obtain an optimized ophthalmic lens element based on the first vision correction up to and including the second specific order and based on combined first and third coefficients above the second specific order and up to and including the first specific order. Further, the current disclosure is directed to a method for manufacturing an ophthalmic lens element, a computer program product and a system for carrying out the methods.

Document U.S. 2005/0270482 A1 shows a method and a system for designing a progressive lens. The method includes modifying a reference progressive lens design having a peripheral design which is suitable for a wearer and design features with known values. The modification of the reference progressive lens design provides a new progressive lens design in which at least one of the design features have been customized according to the wearer's preference. The new progressive lens design has substantially the same peripheral design as the reference progressive lens design.

Document U.S. Pat. No. 8,985,767 B2 shows a method for designing a progressive lens. The method includes obtaining a wavefront measurement of an eye, determining an initial design for the progressive lens based on the wavefront measurement, determining information about how changes in one or more higher-order aberrations of the eye affect a second-order correction for the aberrations of the eye based on information derived from the wavefront measurement, modifying the initial design of the progressive lens to provide a final progressive lens design, and outputting the final lens design.

Hence, there remains a need in the art to provide for an improved design for a progressive spectacle lens taking into account the higher-order aberrations of the individual wearer's eyes. Further, the method may require lesser calculation power.

SUMMARY OF THE INVENTION

Hence, according to a first aspect of the invention, a computer-implemented method for determining an improved design for a progressive spectacle lens is provided, the computer-implemented method including the following steps:

a) Providing an aberration information of a wearer's eye, the aberration information comprising lower-order aberrations of the wearer's eye and higher-order aberrations of the wearer's eye, wherein the lower-order aberrations are aberrations up to and including second order;

b) Providing an initial design optical power distribution and a corresponding initial design of the progressive spectacle lens, wherein the initial design optical power distribution and corresponding initial design being based on the assumption that the wearer's eye and the progressive spectacle lens are free of higher-order aberrations and assumes a predetermined position and orientation of the progressive spectacle lens in front of the wearer's eye as well as a predetermined model for the distances and positions in space for a plurality of objects viewed by the wearer in front of the wearer's eye. In other words the initial design optical power distribution and a corresponding initial design of the progressive spectacle lens was calculated e.g. by a respective lens designer using lower-order aberrations, only, (and a desired addition power) and assuming a predetermined position and orientation of the progressive spectacle lens in front of the wearer's eye as well as a predetermined model for the distances and positions in space for a plurality of objects in front of the wearer's eye viewed by the wearer;

c) Calculating a perceived optical power distribution perceived by the wearer's eye based on the initial design of the progressive spectacle lens and based on the assumption that the wearer's eye and the progressive spectacle lens are not free of higher-order aberrations and therefore comprising the lower-order aberrations of the wearer's eye and the higher-order aberrations of the wearer's eye as well as the lower-order aberrations and the higher-order aberrations of the progressive spectacle lens and assuming the predetermined position and orientation of the progressive spectacle lens in front of the wearer's eye as well as the predetermined model for the distances and positions in space for a plurality of objects in front of the wearer's eye viewed by the wearer of the previously named step;

d) Calculating an improved design optical power distribution by translating the initial design optical power distribution of the progressive spectacle lens, in particular in a plane oblique or perpendicular to a distance direction between the initial design of the progressive spectacle lens and the wearer's eye, and/or rotating the initial design optical power distribution of the progressive spectacle lens, in particular in the plane, such that a deviation between the perceived optical power distribution and the initial design optical power distribution is minimized; and e) Calculating the improved design of the progressive spectacle lens by at least one method step of the group consisting of translating and/or rotating the initial design of the progressive spectacle lens according to the calculated translation and/or rotation and/or optimizing a starting design of the progressive spectacle lens by using the improved design optical power distribution as a target design optical power distribution.

Providing an aberration information of a wearer's eye means in the context of the present description that an aberration information having been acquired anywhere and/or by any person and/or machine is made available for conducting the inventive method. The aberration information may be measurement data such as wavefront measurement data.

Providing an initial design optical power distribution and a corresponding initial design of the progressive spectacle lens means in the context of the present description that an initial design optical power distribution and a corresponding initial design that may have been determined anywhere and/or by any person and/or machine is made available for conducting a method according to the disclosure. The terms initial design optical power distribution and initial design are explained in the BACKGROUND OF THE INVENTION section above.

Minimizing the deviation between the perceived optical power distribution and the initial design optical power distribution in the context of the present description means that the initial design optical power distribution is transformed by translation and/or rotation such that both power distribution profiles show a closer coincidence. In particular, iso-optical power distribution lines may be brought into closer coincidence. Examples are described with reference to the attached Figures.

The search for the optimum (minimum or maximum) under given terms and objectives (mathematical: targets) in general is called optimization (minimization or maximization).

Optimizing a starting design of the progressive spectacle lens, as defined by the second alternative of feature e) above means that a design of the progressive spectacle lens is predefined. One or a plurality of parameters defining this predefined design, which is called here the starting design, are varied during the optimization procedure until a termination criterion is fulfilled. The termination criterion is given by a certain distance to the target design power distribution which according to the disclosure corresponds to the improved design optical power distribution having been determined previously.

A typical optimization process (which may apply for both method steps d) and second alternative of e)) is based on the optimization, in particular minimization, of a cost- or merit-function. A cost- or merit-function, also known as a figure-of-merit function, is a function that measures the agreement between data and the fitting model for a particular choice of parameters.

Typical optimization procedures being applicable with respect to the second alternative of step e) according to the present disclosure are e.g. disclosed in W. Köppen, "Konzeption und Entwicklung von Progressivgläsern", Deutsche Optiker Zeitung DOZ 10/95, pp. 42-46, EP 0 857 993 B2 (U.S. Pat. No. 6,089,713) or EP 1 744 203 A1 (U.S. Pat. No. 7,604,350) using the improved design optical power distribution as a target design optical power distribution.

Rather than to add a general modification to the target design to include higher-order aberrations, also, as contemplated in the prior art, the current disclosure aims to match the perceived optical powers with the initial design optical powers via physically achievable modifications, namely translations and a rotation. This shifts the burden of providing aspects of the design change from weights in optimization to a few parameters, namely the translations and the rotation that can be extracted from the perceived optical power distribution. In particular, given the initial design of the progressive lens, the contemplated translation and rotation can be conducted in "post processing" without changing the surface shape of the initial design of the progressive lens (first alternative in step e) above). This surface shape of the design is translated and rotated relative to the eye leading to new locations for the fitting point and, for example, for the distance design reference point and the near design reference point. It has been found that by a mere translation and rotation, a significant match between the perceived optical powers and the design optical powers can be achieved taking into account the deviations introduced by the higher order aberrations of the eye not taken into account when determining the first design of the progressive lens. In particular, by only applying the translation and rotation, no modifications to the surface shape of the lens according to the initial design have to be conducted but can be achieved via small shifts in the fitting parameters of the design of the lens. Further, the method both effectively compensates the design for the effect of an individual's higher order aberrations, and can be accomplished through simple manipulations of existing progressive lens design tools.

In particular, the translation of the initial design of the progressive lens can be conducted in one or two directions, wherein the one or two directions are each in a plane oblique or perpendicular to the distance direction between the initial design of the progressive lens and the eye. In particular, the determined translation can be different from zero, for example a length or two lengths different from zero. In particular, the determined rotation can be different from zero, for example an angle different from zero.

In particular, the method can be a computer implemented method. The steps of "providing" can mean that a corresponding aberration information or a design optical power distribution is provided as an input into the computer-implemented method. Hence, information about the measured wavefront or about the design optical power distribution according to the initial design previously determined can be imported for the method. However, a step of "obtaining" can also mean that the aberration information or the design optical power distribution are actually determined or measured within the respective step.

The "initial design optical power distribution" is determined to correct for the lower-order aberrations of the eye. In particular, those lower-order aberrations are the aberrations up to and including second-order. The aberrations can inter alia be expressed as commonly known in Zernike polynomials. Establishing a model of the eye including such lower order aberrations only, a prescription can be found to correct for these lower-order aberrations. The polynomials of the model of the eye can be identical to the lower-order aberrations measured previously. The higher-order aberrations are simply set to zero. However, in an alternative refinement, a series of polynomials up to and including second-order can be determined to model or to approximate the measured wavefront aberrations of the eye. As a result, polynomials up to and including second-order are determined that differ from the measured lower-order aberrations since the polynomials up to and including second-order of the model are also influenced by the measured higher-order aberrations. Further, a desired addition power is given and, based on further parameters of the progressive design as, for example, inset, corridor length and/or maximum gradient of spherical power, an initial design optical power distribution of the progressive spectacle lens is determined. Based on that and further individual user parameters like pupillary distance, cornea vertex distance, pantoscopic angle, for example, first design of the progressive spectacle lens is determined and obtained by the method as usual.

Hence, the "initial design of the progressive lens" comprises the shapes of the front and back surfaces of the progressive lens determined via an optimization process to provide for the initial design optical power distribution as good as achievable via the optimization. Further, the initial design may comprise the thickness of the progressive spectacle lens at least at one point, and the refractive index of the material, in particular the refractive index at a reference wavelength. Furthermore, the initial design may comprise fitting parameters, for example inset, cornea vertex distance, pantoscopic angle, wrap angle or face form angle, far design reference point and/or near design reference point, which provide for the positioning of the front and back surfaces relative to the eye.

Due to the spherical power changing between the far and near portion of the eye, an undesired residual astigmatism cannot be avoided in some regions. This residual astigmatism, which is also called astigmatic power error, will be perceived by the wearer. The distribution of this residual astigmatism can be influenced via the other parameters of the initial design optical power distribution. However, it cannot be fully avoided in progressive spectacle lenses. It is, hence, included in the initial design optical power distribution. This astigmatism is the "astigmatic power error" as used in this application. In other words, the astigmatic power error is the—undesired—deviation between a prescribed astigmatic power and an actual astigmatic power provided by the spectacle lens which deviation results in a residual astigmatism perceived by the wearer.

Initially, the initial design of the progressive spectacle lens, the underlying initial design optical power distribution and the aberration information of the eye including the eye's lower- and higher-order aberrations are provided. Based on the initial design of the progressive spectacle lens, and further based on the lower-order aberrations and the higher-order aberrations of the eye, a complete description of the spectacle lens and eye system is provided. Based on that, the actual perceived optical power distribution of the eye can be determined. Methods to accomplish this are generally known to the person skilled in the art and, for example, discussed in documents U.S. Pat. No. 8,985,767 B2 and U.S. 2011/0255052 A1. Given that now the higher-order aberrations of the eye are also included in the determination, a deviation between the perceived optical power distribution and the initial design optical power distribution exists. However, it has been found that no further general modification of the initial design of the progressive lens has to be conducted in a general measure to provide for complete new surface descriptions. Instead, by mere translation and rotation of the initial design as outlined in the first alternative of feature e) above, a very good match between the initial design optical power distribution and the perceived optical power distribution can be provided.

The cornea vertex distance is measured along the Z-direction which shall be the "distance direction" according to the current application. Hence, the distance direction runs parallel to the line of sight in the primary position of the eye. Accordingly, the distance between the progressive spectacle lens and the eye may not be changed or at least not significantly changed. Only a rotation of the progressive spectacle lens in the plane of translation and/or the translation itself is conducted. The "plane" in which the translation and rotation are conducted may be "oblique or perpendicular" to the distance direction. Hence, in one alternative, the plane is perpendicular to the distance direction. In the other alternative, the plane is oblique to the distance direction. In this alternative, the plane oblique to the distance direction can be the "plane of the lens shape" which is the plane tangential to the front surface of a plano or demonstration or dummy lens at its boxed center, when mounted in the frame, cf. section 17.1 of DIN EN ISO 13666: 2013-10. The frame is the frame of the spectacles into which the progressive spectacle lens is to be fitted. As a further example, the plane oblique to the distance direction can be the plane tangential to the back surface in the point of intersection between the back surface and the line of sight in the primary position of the eye.

This translation and rotation compensates a large part of the deviation. Mathematically, if the optimum translation and rotation is found by translating and/or rotating the original initial design optical power distribution to match the perceived optical power distribution, then the opposite or negatives of the calculated values are applied to the design to compensate for the effect of the aberrations. On the other hand, if the perceived optical power distribution is translated and/or rotated to match the design optical power distribution, then those correction values, and not their negatives, can be applied to the initial design optical power distribution to compensate. Hence, the translation and/or rotation provides for the minimized deviation and can then be applied in order to arrive at a final design of the progressive spectacle lens according to which the progressive lens can then be manufactured and, later by the ophthalmologist, fit into the frame.

Further, according to a second aspect of the invention, there is provided a method for manufacturing a progressive spectacle lens, the method comprising the steps of determining a design of the progressive spectacle lens according to a method of the first aspect of the invention or one of its refinements; and manufacturing the progressive spectacle lens with a determined improved design. The method may further comprise tilting the back surface relative to the front surface of the lens to provide for a prescribed prism power and axis. In particular, the step of manufacturing may comprise the tilting of the back surface relative to the front surface of the lens to provide for a prescribed prism power and axis.

Further, according to a third aspect of the invention, there is provided a system for determining an improved design for a progressive spectacle lens, comprising a processing unit configured to execute a method according to the first aspect of the invention or one of its refinements or the second aspect of the invention or one of its refinements.

Further, according to a fourth aspect of the invention, there is provided a non-transitory computer program comprising a program code configured to execute a method according to the first aspect of the invention or one of its refinements or the second aspect of the invention or one of its refinements, when the computer program is run on a data processing device such as a computer.

Further, according to a fifth aspect of the invention, there is provided a progressive spectacle lens element manufactured according to the manufacturing method of the second aspect of the invention.

Therefore, the initially set out objects can be fully achieved.

In a refinement of the method being defined by the second alternative of step e), the method may be characterized in that
- the initial design optical power distribution of step b) comprising a plurality of support points at each of which a corresponding optical power value and a corresponding weighting being defined
- the calculating of step d) comprising translating and/or rotating the plurality of support points with its corresponding optical power values and its corresponding weightings according to the calculated translation and/or rotation and
- the optimizing the starting design of the progressive spectacle lens of step e) comprising minimizing a cost- or merit-function comprising the corresponding optical power values as target optical power values and its corresponding weightings at each of the plurality of support points.

The advantage of this measure consists in that possible unwanted side effects induced by simple design shift will be avoided, such as wrong prismatic power in the prism reference point.

In a further refinement of the method, the method may further comprise that at least one of the group of the following side conditions are taken into consideration when optimizing the starting design:
- individual optical power values at far reference point and/or near reference point for right and left eye
- cornea-vertex distance
- different required characteristic magnification for right and left eye
- forward inclination of frame
- form of frame
- centering
- pupillary distance
- use condition
- different optical powers for right and left eye, with effects on the equalization of prismatic side-effects.

The advantage of this measure consists in that possible unwanted side effects induced by simple design shift will be avoided, such as wrong prismatic power in the prism reference point.

In an additional refinement of either of the methods described above, the method may further comprise that the steps a) to e) are iteratively repeated.

The advantage of this measure is a better fit to the target.

In a further refinement of the method, the method may further comprise
- Determining a multitude of points, wherein the initial design optical power distribution comprises an initial design optical power in each of the multitude of points;
- Determining the perceived optical power distribution by determining, at least in each of the multitude of points, a perceived optical power perceived by the eye based on the initial design of the progressive spectacle lens; and
- wherein the deviation is minimized by determining the translation and/or the rotation such that a total sum of the magnitudes of the differences between the perceived optical powers and the initial design optical powers in the multitude of points is minimized, in particular wherein the perceived optical power and the initial design optical power in each point is the perceived astigmatic power error and initial design astigmatic power error, respectively.

By this, the deviation can be minimized in an advantageous manner. A multitude of points can be arranged across the progressive spectacle lens in various ways. In general, a simple grid could be established with a certain spacing, for example 0.5 mm or less. However, since a progressive spectacle lens design is to be improved, it is to be expected that there are no deviations in the distance portion of the progressive spectacle lens. Therefore, the grid may, for example, be placed only over the intermediate and near portion, in particular in a closer grid, for example with a spacing of 0.2 mm. Of course, the more points are chosen the more calculation power is needed to find an optimum for the match between the perceived optical power distribution and the initial design optical power distribution. Further, it has been found that parts of the progressive spectacle lens outside the most common field of view, for example outside of the intermediate corridor, are not as important to be matched as the area is close to the intermediate corridor. Therefore, this can be sensible to place the multitude of points along the intermediate corridor, in particular in areas with low initial design astigmatic power error, for example in areas with an initial design astigmatic power error less than or equal to 1 diopter, in particular less than 0.5 diopters.

In a refinement of the method, the perceived optical power and the initial design optical power in each point is a perceived astigmatic power error and an initial design astigmatic power error, respectively. In particular, the perceived optical power can be only the perceived astigmatic power error. In particular, the initial design optical power can be only the initial design astigmatic power error.

Hence, at each point, the difference between the perceived astigmatic power error and an initial design astigmatic power error is determined. The magnitude of the differences across all points is then minimized. The "astigmatism" in this context may be astigmatic difference according to section 12.4 of standard DIN EN ISO 13666: 2013-10, namely the vertex power in the second principal meridian minus that in the first principal meridian. Herein, the astigmatic difference is defined to be always positive. Alternatively, a different optical power may be used. For example, the difference between an initial design spherical power error and a perceived spherical power error could be used. The term spherical power error may also be the mean spherical power error. Further, for example an absolute or total astigmatism could be used, i.e. the combined prescribed astigmatic power and astigmatic power error.

To determine the perceived optical powers, the vertex distance or cornea vertex distance according to section 5.27 of standard DIN EN ISO 13666: 2013-10 can be determined, namely the distance between the back surface of the progressive spectacle lens and the apex of the cornea, measured along the line of sight perpendicular to the plane of the spectacle front. The vertex distance can be determined of the individual wearer. Alternatively, a standard value might be assumed, e.g. 15 mm. Further, a distance from the apex of the cornea to the eye's center of rotation can be approximated by a standard value of 13.5 mm.

In a further refinement of the method, the step of calculating the improved design optical power distribution of the progressive spectacle lens comprises only translating and/or rotating the initial design optical power distribution of the progressive spectacle lens. In particular the method may comprise that the step of calculating the improved design optical power distribution of the progressive spectacle lens comprises exclusively translating and rotating the initial design optical power distribution.

Therefore, further to the translating and rotating, no further modifications or alterations of the initial design optical power distribution are conducted. This has provided for a significant reduction of the deviations between the perceived optical power distribution and the initial design optical power distribution. In particular taking into account further deviations introduced in the lens eye system in the "as worn" position, i.e. the actual usage of the spectacles, the reduction achieved via translation and rotation only can be considered sufficient.

In a further refinement of the method, the step of calculating an improved design optical power distribution by translating and/or rotating comprises establishing an optimization space including possible translations and rotations and minimizing the deviation, in particular the sum of the magnitudes of the differences between the initial design optical power and the perceived optical power across all points, and wherein the optimization space comprises ranges for the possible translations and rotations. In particular, a range for each translation may be a magnitude of the translation of 1.5 mm or less, and a range of the rotation may be a magnitude of an angle of 1.5 degrees or less. Other boundary conditions may be set. For the translation, a range for each translation may be a magnitude of the translation of 2.5 mm or less, 2.0 mm or less, 2.5 mm or less, 1.0 mm or less, or 0.5 mm or less. For the rotation, a range of the rotation may be a magnitude of an angle of 2.5 degrees or less, 2.0 degrees or less, 1.5 degrees or less, 1.0 degrees or less, or 0.5 degrees or less.

Hence, an optimization space comprising a translation, in particular two translation distances, and/or an angle of rotation is established. Within this optimization space, various combinations of the parameters are tried and the perceived optical power distribution is calculated and the deviation to the initial design optical power distribution is calculated. The set of parameters of translations and rotation that minimizes the total magnitude of the difference between the initial design optical power and the perceived optical power across all points is the optimum.

In a further refinement of the method, providing the initial design comprises:

Determining the initial design optical power distribution by determining a prescription correcting for the lower-order aberrations of the eye and determining the initial design optical power distribution based on the prescription (and the desired addition power) based on a model of the aberrations of the eye, wherein the model includes aberrations only up to and including second-order, wherein the prescription comprises at least one of a spherical power, a cylindrical power and a cylinder axis;

Determining the initial design of the progressive spectacle lens based on the initial design optical power distribution based on a model of the aberrations of the eye, wherein the model includes aberrations only up to and including second-order, wherein the initial design of the progressive spectacle lens comprises a progressive spectacle lens shape, in particular and fitting parameters, providing for the initial design optical power distribution.

In particular, the desired addition power, the spherical power and the cylindrical power are different from zero. In particular, the initial design optical power distribution does only comprise a spherical power and/or a cylindrical power with cylinder axis. In particular, in other words, the initial design optical power distribution may e.g. not comprise a prism power and respective prism base. By this, the initial design of the progressive spectacle lens is determined based on the measured wavefront of the eye in a manner generally known for a person skilled in the art. As laid out initially, the step of "providing" the initial design of the progressive spectacle lens and the initial design optical power distribution may be conducted in that corresponding sets of data are received as a basis for the further method. However, the method can also include actually determining the initial design optical power distribution and the initial design of the progressive spectacle lens based on the aberration information. Based on those aberration information, the initial design optical power distribution is determined based on a second-order model of the eye, in particular the aberrations up to and including second order, in particular in Zernike polynomials or any other kind of suitable polynomials such as Taylor-, Cheby-chev-polynomials or Seidel-aberrations etc. Hence, the aberrations of the eye are modeled with a second-order approach for the aberrations. The polynomials of the model of the eye can be identical to the lower-order aberrations measured previously. The higher-order aberrations are simply set to zero. However, in an alternative refinement, a series of polynomials up to and including second-order can be determined to model or to approximate the measured wavefront aberrations of the eye. As a result, polynomials up to and including second-order are determined that differ from the measured lower-order aberrations since the polynomials up to and including second-order of the model are also influenced by the measured higher-order aberrations. For this, there can be found a prescription to correct for these aberrations. Further, based on that prescription, a desired addition power and a general progressive design providing for the transition from the distance portion providing for the prescription powers and a near portion providing for an additional spherical power, the initial design optical power distribution can be determined. Then, based on that initial design optical power distribution, an initial design of the progressive spectacle lens can be determined. In particular, the initial design can include the surface shapes that can be manufactured to provide for the initial design optical power distribution. Further, the initial design can include the thickness of the progressive spectacle lens. The surface shapes and the thickness are determined via an optimization process. Hence, it may be that the initial design of the progressive spectacle lens does not exactly provide for the initial design optical power distribution. But, it does provide for the initial design optical power distribution in an optimal manner based on the respective optimization criteria. Further, the initial design includes fitting parameters to place the progressive spectacle lens in front of the wearer's eye.

Different kinds of merit functions and optimization metrics to provide results of objective refraction techniques have been contemplated and are well known to a person skilled in the art. Examples are given for example in document U.S. Pat. No. 7,857,451 B2 "System and method for optimizing clinical optic prescriptions", document U.S. 2012/0069297 A1 "Eyeglass prescription method", U.S. 2005/0110946 A1 "Objective manifest refraction", WO 03/092485 A1 "Sharpness metric for vision quality", U.S. 2008/0100800 A1 "Eyeglass prescription method", U.S. 2009/0015787 A1 "Apparatus and method for determining an eyeglass prescription for a vision defect of an eye" and document U.S. Pat. No. 8,205,987 B2 "Method for optimizing a spectacle lens for the wavefront aberrations of an eye".

The one or more parameters characterizing the eyeglass prescription comprise one or more parameters selected from the group consisting of spherical power, cylinder power (astigmatic power), cylinder axis, or the respective transformation terms M, $J_0$ and $J_{45}$ from the Zernike series. In particular, the parameters may be either spherical power, cylinder power and cylinder axis or may be M, $J_0$ and $J_{45}$.

Of course, further parameters might be possible, for example second-order Zernike polynomials. Whether the parameters may be set to sphere, cylinder and axis or M, $J_0$, $J_{45}$ or may be even set to the second-order Zernike coefficients, may depend on the function used or any other preference. All parameters or combinations of parameters may be equally used. As a person skilled in the art is readily aware of, a set of parameters comprising sphere, cylinder and axis may be re-calculated to provide a set of parameters comprising of M, $J_0$ and $J_{45}$. Further, the second-order Zernike coefficients $C_2^0$, $C_2^{+2}$ and $C_2^{-2}$ can be used as the set of parameters. However, even these Zernike coefficients may be derived from a set of parameters M, $J_0$ and $J_{45}$.

In a further refinement of the method, the multitude of points has a number of at least eight.

In general, the higher the number of points used for calculating the translations and the rotation to align the perceived optical power distribution with the design optical power distribution, the higher the calculation effort to be conducted to minimize the total sum of the deviations across all points. In turn, a small number might find a quick result for the translations and the rotation but might not align the perceived optical power distribution and the initial design optical power distribution as good as possible. It has been found that eight points can provide for a quite good estimation of the translations and the rotation angle. However, the number of points could also be set to at least 16, at least 32 or at least 64, for example.

In a further refinement of the method, the initial design optical power distribution comprises a line indicating a design astigmatic error of 0.5 diopters, and wherein each of the multitude of points is on the line indicating the design astigmatic power error of 0.5 diopters.

Therefore, the multitude of points, in particular at least six points, are provided on the line of a design astigmatic power error of 0.5 diopters. The multitude of points is on that line. Further to the multitude of points, other points may be present in which the perceived optical power and the design optical power are compared. However, the multitude of points with their respective number is placed on the line of a design astigmatic power error of 0.5 diopters. It has been found that this line is descriptive of large parts of the initial design optical power distribution and covers a significant area of the visual field important for the perception of the wearer. The higher the astigmatic power error, the smaller the areas of the progressive spectacle lens being affected. Hence, putting a focus on the alignment of the line designating astigmatic power error of 0.5 diopters has been found to provide a good match for the complete optical power distribution. For example, the multitude of points could be equally spaced on that line or could be put in a predefined spacing, for example 1 mm along that line. Hence, this would not result in an equally spaced grid over the lens but in the points only being distributed along the line of initial design astigmatic power error of 0.5 diopters.

In a further refinement of the method, a center of the rotation is set to a geometrical center of the design of the progressive spectacle lens.

Usually, the designs are calculated for a circular or elliptical lens blank. Therefore, the center of the circular edge or the center of the ellipse, that is, the intersection of the ellipse axes, can be defined as the center for the rotation.

Further, in a refinement, the center of the rotation can be set of a middle of an intermediate corridor of the initial design of the progressive spectacle lens.

For example, the intermediate corridor can be defined as a straight line from the distance design reference point to the near design reference point. The center of the rotation could then be set to half of that distance.

In a further refinement of the method, the initial design of the progressive spectacle lens comprises a set of progressive spectacle lens design parameters, and the method further comprises iteratively repeating the steps to determine the improved design of the progressive spectacle lens and optimizing the set of progressive spectacle lens design parameters such that the deviation between the perceived optical power distribution and the initial design optical power distribution is further minimized.

By this, in addition to the translation and rotation, the initial design of the progressive spectacle lens is amended by optimizing certain parameters of the progressive spectacle lens design to better match the perceived optical power distribution with the initial design optical power distribution. Those progressive spectacle lens design parameters could for example be the length of the intermediate corridor, the sizes of the distance zone and the near zone, a gradient of the spherical power along the corridor for the transitions from the distance zone to the near zone or the inset of the near design reference point relative to the distance design reference point.

Of course, a change of any of these parameters would require a new initial design of the progressive spectacle lens to be calculated. Again, this has to be done based on a model of the aberrations of the eye, wherein the model includes aberrations only up to and including second-order. Then, again the perceived optical power distribution would need to be calculated. Afterwards, the translation and rotation could be calculated as laid out, wherein the progressive spectacle lens design parameters could result in a better match of the initial design optical power distribution with the perceived optical power distribution by translation and rotation. Mathematically, the parameters can be found by matching the initial design optical power distribution to the perceived optical power distribution. Then, the opposite or negatives of the calculated values are applied to the initial design to compensate. Again, on the other hand, if the perceived optical power distribution is matched to the transformed (by translation and/or rotation) initial design optical power distribution, then those correction values, and not their negatives, can be applied to the initial design optical power distribution to compensate. However, it can be advantageous to alter parameters to match the initial design optical power distribution to the perceived optical power distribution. After the process has converged, the design is re-determined with changes in the parameters, for example inset and corridor length, of the opposite signs, then the translations and rotation of the opposite signs would be applied. Some further small improvements can be provided by this. However, it would require an amendment to the initial design of the progressive spectacle lens.

In a further refinement of the method, the set of progressive spectacle lens design parameters comprises at least one of an inset, a length of an intermediate corridor and a maximum gradient spherical power. Further, the size or boundaries of the near zone and/or the distance zone could be one of the progressive spectacle lens design parameters.

By this, the basic progressive spectacle lens layout can be amended. Further, these parameters or the respectively amended parameters can be considered to be nearly physically achievable so that no disadvantageous effects on the general optical design layout come into effect.

In a further refinement of the method, the optimization of the set of progressive spectacle lens design parameters is conducted by establishing an optimization space comprising the set of progressive spectacle lens design parameters and, in each step of the optimization, determining a new initial design based on a new set of progressive spectacle lens design parameters and, based on that new initial design, determining a new improved design.

By this, in an iterative manner, there can be found a set of progressive spectacle lens design parameters providing best basis to minimize the deviation between the initial design optical powers and the perceived optical powers so that the determined translations and rotation of that particular initial design is then used to translate and rotate that particular initial design to define the improved progressive spectacle lens design.

In a further refinement of the method, the lower order aberrations and the higher order aberrations are expressed as Zernike polynomials.

This is the most common expression for wavefront aberrations and to express optical aberrations.

In particular, throughout the application, any reference being made to "orders" of aberrations can exemplarily be related to an expression via Zernike polynomials. In case of Zernike polynomials, the term "order" means the radial order or radial degree of the Zernike polynomial.

In a further refinement of the method, the higher-order aberrations only comprise aberrations of third and/or fourth order.

By this, the calculation of the perceived optical power distribution can be simplified.

In a further refinement, each optimization can be done by a least square optimization.

These methods are generally known and in particular provide for good solutions for minimization problems of differences and deviations, respectively.

In a further refinement, the method is a computer-implemented method.

That is, every step of the method can be conducted in an automated manner leading to the improved design.

In further refinement, the aberration information of the eye is a wavefront measurement or obtained via a wavefront measurement. Other methods like ocular Magnetic Resonance Tomography (MRT) or Optical Coherence Tomography (OCT) are also conceivable to determine the shape of the parts of the eye and to derive the aberration information therefrom.

In a further refinement, the translation and the rotation of the initial design of the progressive spectacle lens is determined in a plane oblique or perpendicular to a distance direction between the initial design of the progressive spectacle lens and the eye. The plane may not include the line of sight.

Hence, any movement or rotation of a progressive spectacle lens design according to the current invention can be within a plane perpendicular to the distance direction. Alternatively, the plane may be oblique to the distance direction, for example the plane of the lens shape, which is the plane tangential to the front surface of a plano or demonstration or dummy lens at its boxed center, when mounted in the frame, or it may be the plane tangential to the back surface in the point of intersection between the back surface and the line of sight in the primary position of the eye. In particular, the plane oblique to the distance direction may include an angle of at least 70 degrees with the distance direction in both the X-Z plane and the Y-Z plane, i.e. it is not tilted by more than 20 degrees relative to the plane perpendicular to the distance direction.

In a further refinement of the system according to the third aspect of the invention, the system further comprises a wavefront aberrometer configured to measure a wavefront indicative of the refractive properties of the eye. Again, the wavefront aberrometer may be a Hartmann-Shack sensor, a Tscherning aberrometer, a Talbot aberrometer or a double-pass aberrometer.

In a further refinement, the wavefront aberrometer is located at a first site, wherein the processing unit is located at a second site, and wherein the first site and the second site are connected via a data network.

As laid out above, this may enable a single processing unit serving a multitude of spectacle shops each having a wavefront aberrometer. Hence, a single second site, wherein the processing unit is located, may be connected via the data network to a multitude of first sites. This avoids the necessary calculation power to be directly situated at each first site or spectacle shop, for example.

In a further refinement, the system comprises an output device configured to output the improved design and/or the improved design optical power distribution.

As laid out above, the output device may be an electronic display or a printer. Further, the output device may be a storage medium that stores the improved design and/or the improved design optical power distribution.

It goes without saying that the features mentioned above and the features to follow cannot only be used in the combinations provided but also in different combinations or alone without departing from the scope of the current invention.

BRIEF DESCRIPTION OF THE DRAWINGS

Other features and advantages of the invention will be apparent from the following detailed description. Unless otherwise defined, all technical and scientific terms used have the same meaning as commonly understood by one of ordinary skill in the art to which this invention belongs. In the drawings:

FIG. 4 shows a visualization of an example deviation between the astigmatic power error in the y-direction;

FIG. 5 shows a visualization of an example deviation between the astigmatic power error in the rotational direction;

FIG. 6 shows a statistical analysis of deviations in the x-direction, the y-direction and the rotational direction;

DESCRIPTION OF THE PREFERRED EMBODIMENTS OF THE INVENTION

Figure 1:
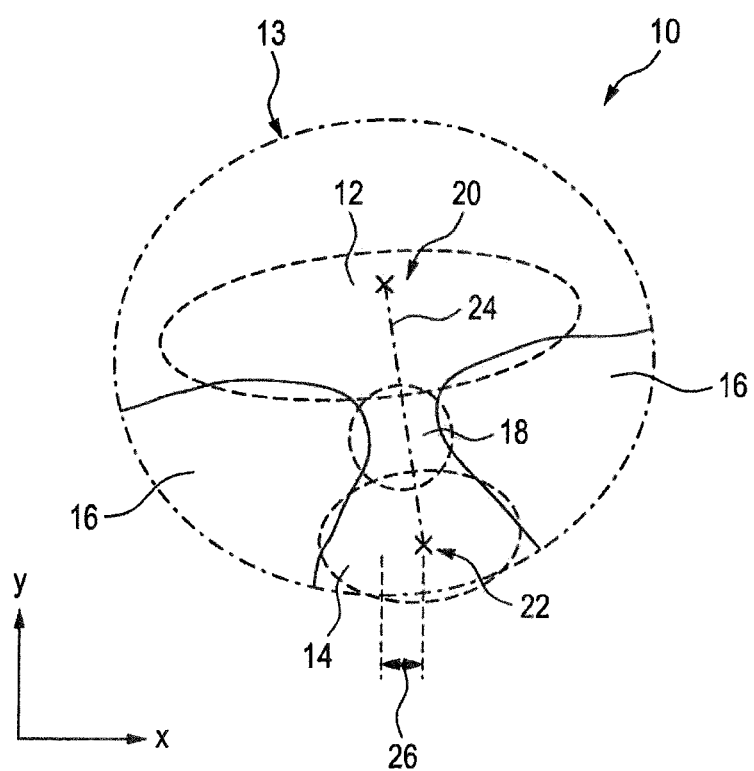
FIG. 1 shows a schematic progressive lens and elements of its design.

FIG. 1 shows a lens 10 and aspects of its design. The lens 10 shall be a progressive spectacle lens meaning that a spherical power of a lens increases from a distance viewing portion 12 to a near viewing portion 14. These areas of a lens can also be described as a distance zone 12 and the near zone 14. The example depicted in FIG. 1 has an orientation as it would, for example, appear in front of a wearer's left eye, i.e. with the near zone being shifted towards the nose of the wearer. A boundary 13 of the lens 10 is depicted to be circular. However, this is not mandatory. There are also lens blanks known with elliptical boundaries. Further, the design of a lens as a mathematical description of its surfaces can mathematically extend beyond the edge 13 of the then actually manufactured lens 10. Therefore, the boundary 13 is merely provided for illustrated purposes.

Between the distance zone 12 and the near zone 14, there are blending regions or periphery 16, in which high levels of astigmatic power error occur. Hence, the periphery is usually not considered optically useful for the wearer. In the near zone, the mean spherical power is more positive than in the distance zone. For example, the mean spherical power of the near zone could be +2.0 diopters higher than that of the distance zone. Between the two zones 12 and 14, there is a so-called progressive corridor or intermediate corridor 18 along which only a very low astigmatic power error occurs since this progressive corridor 18 is the corridor along which it is assumed the eye moves when going from the distance zone 12 into the near zone 14. A distance design reference point is numerated with reference numeral 20. At the distance design reference point, the distance power matches the design distance power. The same applies for a near design reference point 22 in which the desired power in the near zone is matched. The near design reference point is shifted towards the nose of the wearer in the example. Hence, that shift designated by the so-called inset 26 is shown as well. Hence, the inset 26 is the deviation in the X-direction of the near design reference point relative to the distance design reference point.

A direct line from the distance design reference point 20 to the near design reference point 22 is enumerated by reference numeral 24, it may be called the gradient line. Along this line, the mean spherical power transitions from the end of the distance zone and the mean spherical power in the distance zone towards the beginning of the near zone and the mean spherical power desired within the near zone. The sizes or areas of the near and distance zones 12, 14 can be designed independent of the length of the progressive corridor. Large zones tend to produce "hard" designs because the area of the peripheral zones 16 is decreased. The peak astigmatism, and the gradient of astigmatism, both increase as a peripheral zone 16 decreases in area. The "hard" in the hard design is related to the gradient of astigmatic power error between the clear zones and the periphery. The length of the corridor determines the gradient of mean power between the distance and near zones. All of these parameters can scale directly with the addition power of the lens. Whether a "hard" or "soft" design is preferable for an individual wearer might vary.

Figure 2:
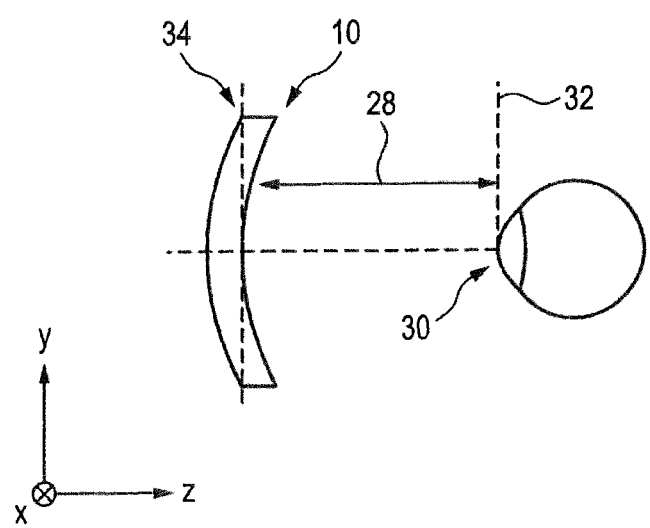
FIG. 2 shows a schematic depiction of a lens-eye system.

FIG. 2 shows an example of a lens eye system. The lens is again designated by reference numeral 10. The eye is designated by reference numeral 30. Concerning the eye, standard parameters can be used when calculating optical powers in a lens eye system. For example, standard values can be used for the diameter of the eye. The lens is placed in front of the eye in the lens eye system. A lens plane is designated by reference numeral 34. From the back surface of the lens 10 towards the cornea of the eye 30, there is the cornea vertex distance 28 which is an individual parameter depending on the wearer's facial dimensions. The cornea vertex distance is measured along the Z-direction which shall be the "distance direction" according to the current application. Hence, the distance direction runs parallel to the line of sight in the primary position of the eye. An eye plane shall be at the cornea vertex designated by reference numeral 32. Hence, any movement or rotation of a lens design according to the current disclosure can be within a X-Y-plane, i.e. a plane perpendicular to that distance direction. Alternatively, the plane may be oblique to the distance direction, for example the plane of the lens shape, which is the plane tangential to the front surface of a plano or demonstration or dummy lens at its boxed center, when mounted in the frame, or it may be the plane tangential to the back surface in the point of intersection between the back surface and the line of sight in the primary position of the eye. In particular, the plane oblique to the distance direction may include an angle of at least 70 degrees with the distance direction in both the X-Z plane and the Y-Z plane, i.e. it is not tilted by more than 20 degrees relative to the plane perpendicular to the distance direction.

With reference to FIGS. 3 to 7, there will now be explained the general technical background of the current disclosure.

In general, the invention is a simplified way to address the small variation to the perceived optics of a progressive lens taking into account the measured higher order aberrations (HOAs) of the individual wearer's eye. The basic idea is to reduce the complex variations over the lens to a few parameters. The simplest parameters are a translation and rotation of the lens. This would not require any re-optimization, and could be applied to the design post-processing. The next level of parameters would be parameters which are currently addressed in existing calculation engines, such as inset, corridor length, sizes of a distance viewing zone and a near viewing zone or a gradient of the transition of the spherical power. These could be implemented without any significant change to current optimizations.

Analyzing the optics of progressive spectacle lenses as modified by some of the eyes in a large database of actual wearer's eyes, certain observations can be made. The bulk of the near and distance zones of the lens are unaffected. This is obvious because the lens has very low HOAs in those regions by design. The areas most affected are the corridor and the zone boundaries, for the simple reason that those regions of the lens have the highest aberrations.

Further, it can be assumed that the spatial distribution of the astigmatic power error or residual astigmatism is more critical than that of the mean power error in a progressive spectacle lens. It is not possible to fully control both. When looking through a section of the lens which has no cylindrical error and any negative mean power error there will be some distance for which the image is clear. When looking through a section with a significant cylindrical error (astigmatic power error) there is no clear distance. Therefore, the distribution of astigmatic power error dictates the potentially useful region of the lens. It is particularly important to align the corridor of the design with the principal gazing direction of the wearer.

As a result of the above, the horizontal location of the corridor, as defined by the channel of minimum astigmatic power error in the lens-plus-eye system, is both a critical aspect of the lens and a region guaranteed to have lens HOAs of large magnitude, and therefore is potentially modified by the HOAs of the eye.

The effect of HOAs on the perceived optical power distribution of a lens is a complex two-dimensional distribution. The issue is how well a simple translation and rotation of the lens can approximate the full effect.

Figure 3:
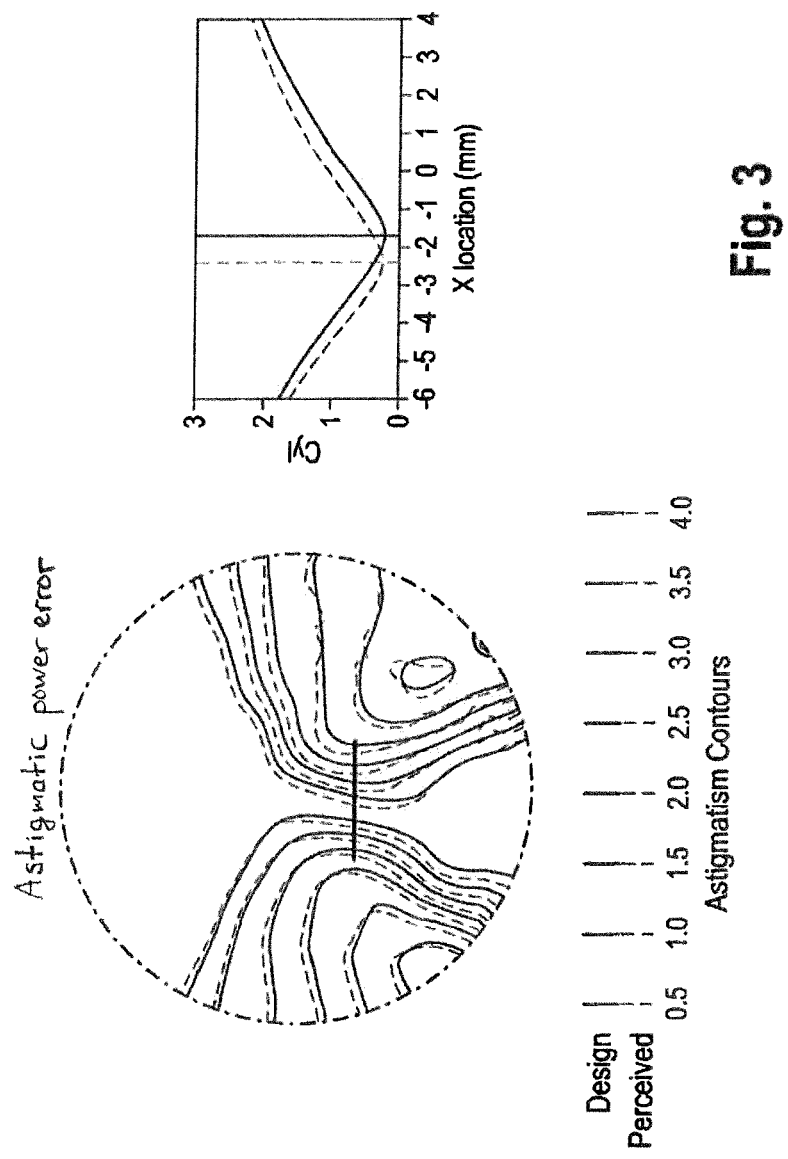
FIG. 3 shows a visualization of an example deviation between the astigmatic power error in the x-direction.

The perceived optical power distribution of a plano 2.50 diopters addition progressive spectacle lens using only the HOAs and zeroing out the second order terms of 500 example eyes with pupil diameters between 4.75 and 5.25 mm were analyzed. As a comparison, known optimizations were conducted to calculate the distribution of optimal prescriptions. For a simple estimate of the translation in "X", the horizontal shift in the location of minimum cylindrical power near the vertical center of the corridor was analyzed. FIG. 3 includes an overlay map of the optical astigmatism of the design, which is identical to the design astigmatic power error since this example is based on a plano 2.50 diopters addition progressive spectacle lens, and the perceived astigmatic power error of a wearer with a specific set of HOAs. The contours are at 0.50 diopter intervals. The map shows an obvious lateral displacement of the corridor.

The graph to the right in FIG. 3 plots the design and perceived astigmatic power error across the region of the eye-path shown by the black line in the map. The difference between the locations of the minima of these two functions was taken as an estimate of the horizontal shift of the eye-path.

A similar calculation was performed to estimate the vertical shift of the distance zone boundary. In this case difference between the locations of the 0.50 D contours taken along the pair of vertical lines shown in FIG. 4 was used to estimate the vertical shift. The average of the two shifts was used as the estimate.

Finally the rotation angle was estimated by averaging the four angular differences in the 0.50 D contours taken along the arcs shown in FIG. 5.

FIG. 6 shows the distribution of these measures calculated using the HOAs from 500 example eyes. Approximately, 25% of the eyes have a horizontal corridor shift of 0.5 mm or more, 25% have a vertical shift of the distance zone of 0.5 mm or more, 25% have a rotation of 0.5 degrees or more; and about 60% have a shift of 0.5 or more in one or more of the three parameters.

The changes caused by the HOAs of typical eyes to the perceived optical power distribution of a progressive spectacle lens are fairly small. To a large extent these changes and in particular the astigmatic power error component can be compensated for by a simple translation and rotation of the lens.

Figure 7:
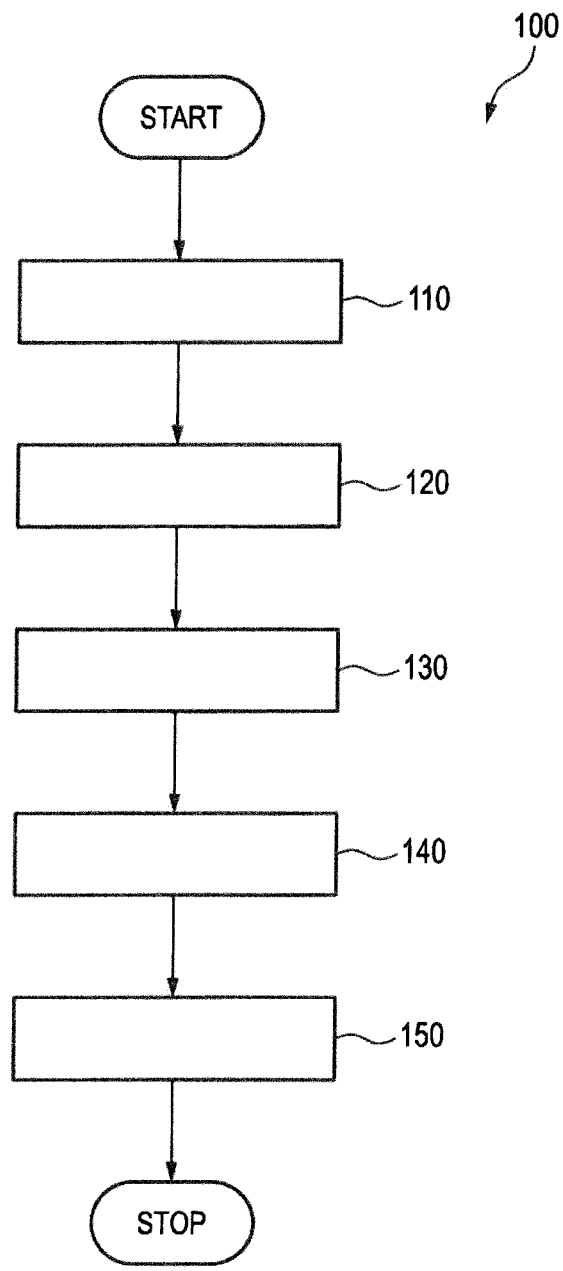
FIG. 7 shows an embodiment of a method according to the invention.

FIG. 7 shows an embodiment of a method according to the current invention. The method is for determining an improved design for a progressive spectacle lens.

After the start of the method, in step 110, there is obtained an aberration information of an eye, the aberration information comprising lower-order aberrations of the eye and higher-order aberrations of the eye, when the lower-order aberrations are aberrations up to and including second-order. In particular, these aberration information can be expressed in Zernike polynomials. In general, these aberration information of the eye can be obtained via an aberrometer or any other objective wavefront measurement device commonly known. Other methods like ocular MRT are also conceivable to determine the shape of the parts of the eye and to derive the aberration information therefrom.

Further, in step 120, there is obtained a design optical power distribution in the initial design of the progressive spectacle lens, when the initial design optical power distribution is designed to correct for the lower-order aberrations of the eye and to provide for a desired addition power, and wherein the initial design of the progressive spectacle lens is determined to provide for the initial design optical power distribution based on a model of the aberrations of the eye, wherein the model includes aberrations only up to and including second-order. Such initial design optical power distribution and initial design of the progressive spectacle lens can also be input into the method and could have been predetermined via commonly known techniques. However, it can also be determined within the step of obtaining directly within the method.

Then, in step 130, there is determined a perceived optical power distribution perceived by the eye based on the initial design of the progressive spectacle lens, the lower-order aberrations of the eye and the higher-order aberrations of the eye.

In step 140, there is determined a translation of the initial design optical power distribution of the progressive spectacle lens in a plane oblique or perpendicular to a distance direction between the initial design optical power distribution of the progressive spectacle lens and the eye, and a rotation of the initial design optical power distribution of the progressive spectacle lens in the plane, which is the plane perpendicular or oblique to the distance direction, such that a deviation between the perceived optical power distribution and the initial design optical power distribution is minimized. In particular, this minimization can take into account a design astigmatic power error and perceived astigmatic power error, only. In alternative embodiments, not only the perceived design astigmatic power error may be taken into account but also a design and perceived mean spherical power error distribution.

Last, in step 150, after the translation and rotation have been determined, the improved design of the progressive lens is determined by translating and rotating the first design of the progressive lens according to the determined translation and rotation. Mathematically, if the translation and rotation is found by translating and rotating the initial design optical power distribution to match the perceived optical power distribution, then the opposite or negatives of the determined values are applied to the original design to compensate for the effect of the aberrations. On the other hand, if the perceived optical power distribution is translated and rotated to match the initial design optical power distribution, then those correction values, and not their negatives, can be applied to the initial design optical power distribution to compensate.

The method then ends.

Figure 8:
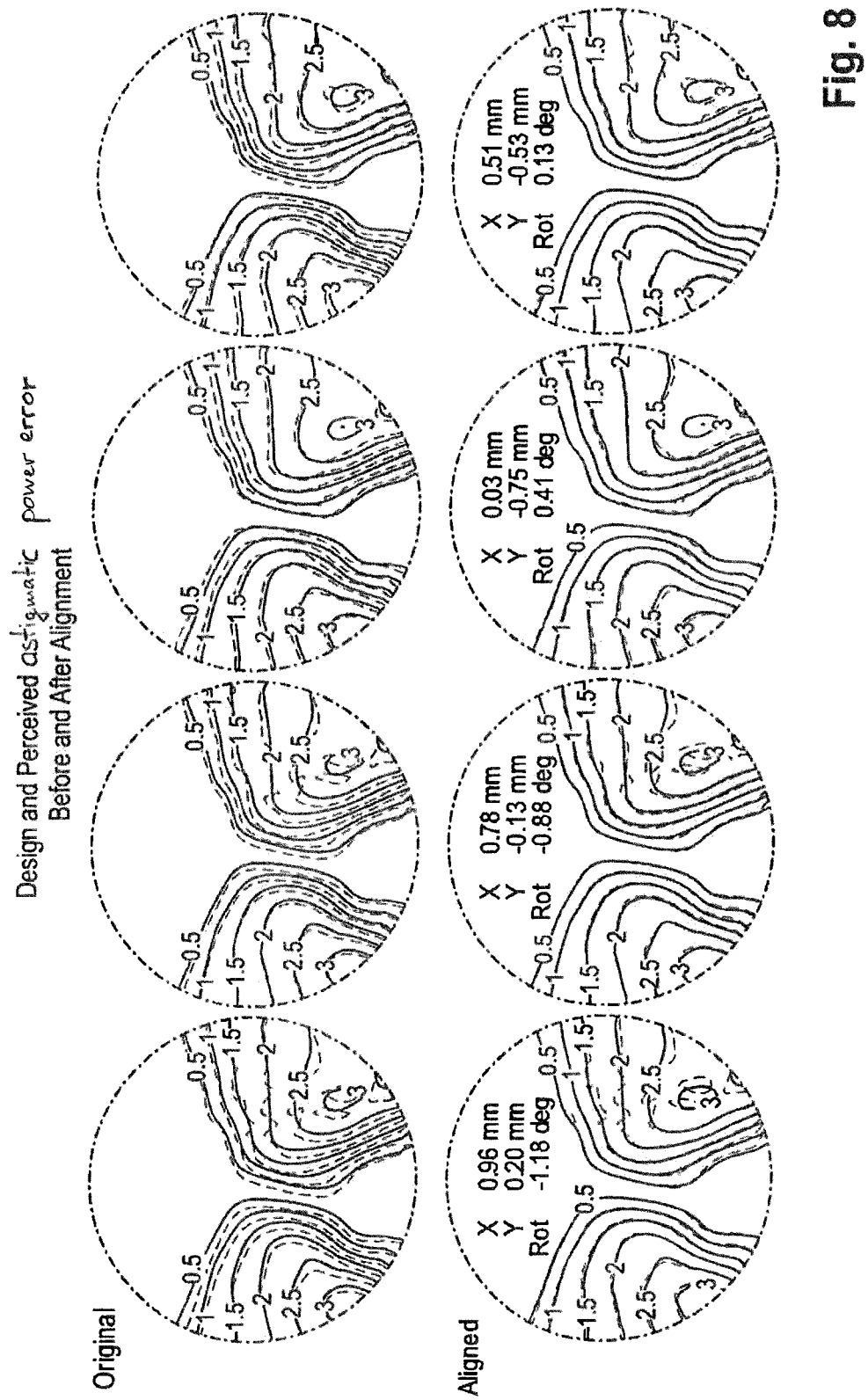
FIG. 8 shows four examples of the application of the method according to the invention.

FIG. 8 shows four examples of an application of the method according to the embodiment of FIG. 7. For these examples the alignment between the design and perceived astigmatic power error distributions was determined by examining only the 0.50 D astigmatism contours. The alignment was achieved by calculating the value of the perceived astigmatic power error along the location of 0.50 D contours of the initial design astigmatic power error, left and right, and then adjusting the $\Delta X$, $\Delta Y$, and rotation angle, taken around the middle of the eye-path, to minimize the sum of the absolute difference in astigmatism along the paths.

The four examples were chosen specifically because they had significant shifts predicted by the simple calculations. The example on the left had a large shift in the X direction, the next over has a large rotation, the next-to-right has a large Y shift and the right most has both X and Y shifts of similar magnitude. These examples where the shifts are relatively large show good registration everywhere after alignment of the 0.50 D contours. Hence, this implies that simple translation and rotation is a reasonable approximation to the full effect of HOAs on the perception of the lens for most eyes.

Figure 9:
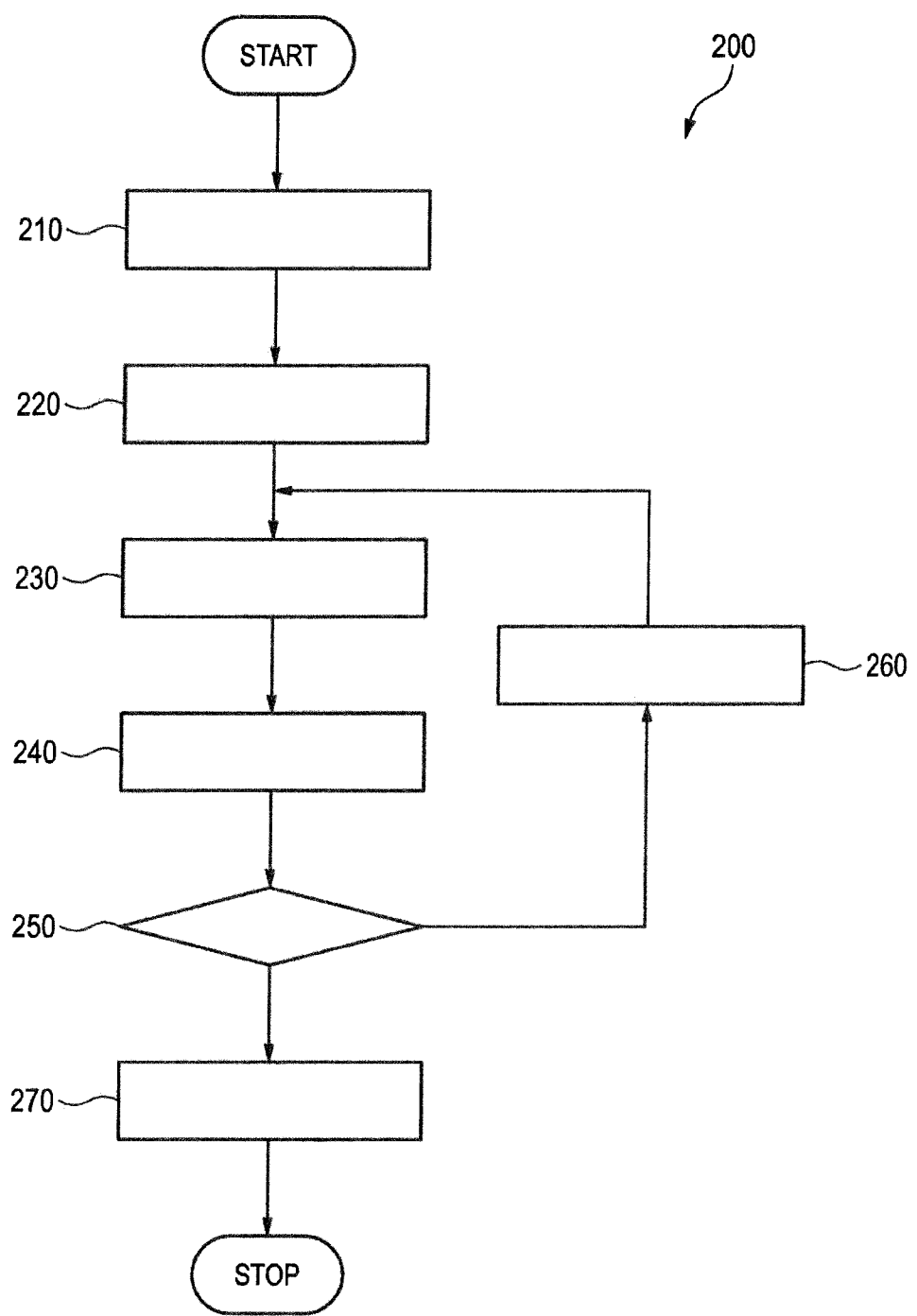
FIG. 9 shows a further embodiment of a method according to the invention.

FIG. 9 shows an alternative embodiment 200 of the method according to the current invention.

After the method has started, as in the above method 100, in step 210, there is obtained an aberration information of an eye, the aberration information comprising low order aberrations of the eye and high order aberrations of the eye, when the lower order aberrations are aberrations up to and including second order.

In step 220, there is then obtained a design optical power distribution and a first design of the progressive spectacle lens, when the initial design optical power distribution is designed to correct for the lower-order aberrations of the eye and to provide for a desired addition power, and wherein the initial design of the progressive spectacle lens is determined to provide for the initial design optical power distribution based on a model of the aberrations of the eye 30, wherein the model includes aberrations only up to and including second-order.

Then, as laid out, in step 230, there is determined the perceived optical power distribution perceived by the eye based on the initial design of the progressive spectacle lens, the lower-order aberrations of the eye and the higher-order aberrations of the eye.

In step 240, there is determined the translation of the initial design optical power distribution of the progressive spectacle lens in the plane, in particular in two directions in the plane, wherein the two directions are each perpendicular or oblique to a distance direction between the initial design of the progressive spectacle lens and the eye, and a rotation of the initial design optical power distribution of the progressive spectacle lens and the plane perpendicular or oblique to the distance direction, such that a deviation between the perceived optical power distribution and the initial design optical power distribution is minimized.

However, then, according to this embodiment of the method, there is further, in a second level, optimization of the progressive spectacle lens design parameters of the design of the progressive spectacle lens conducted. In particular, these design parameters may include at least one of an inset, a length of an intermediate corridor and a maximum gradient of spherical power. Hence, the steps 230 and 240 are repeated in an iterative manner. In step 250, there is determined whether the iteration has converged. If not, a change in the set of parameters of the progressive design is conducted in step 260. Afterwards, a new initial design is found that can then be improved via translation and rotation in steps 230 and 240. Then, again, in step 250, there can be determined whether the iteration has converged. Again, if not, steps 260, 230 and 240 will be conducted in another iterative loop.

If the process has converged and the translations and rotation are found, the translations and rotation are applied to the current initial design to arrive at the final design of the progressive spectacle lens in step 270.

Figure 10:
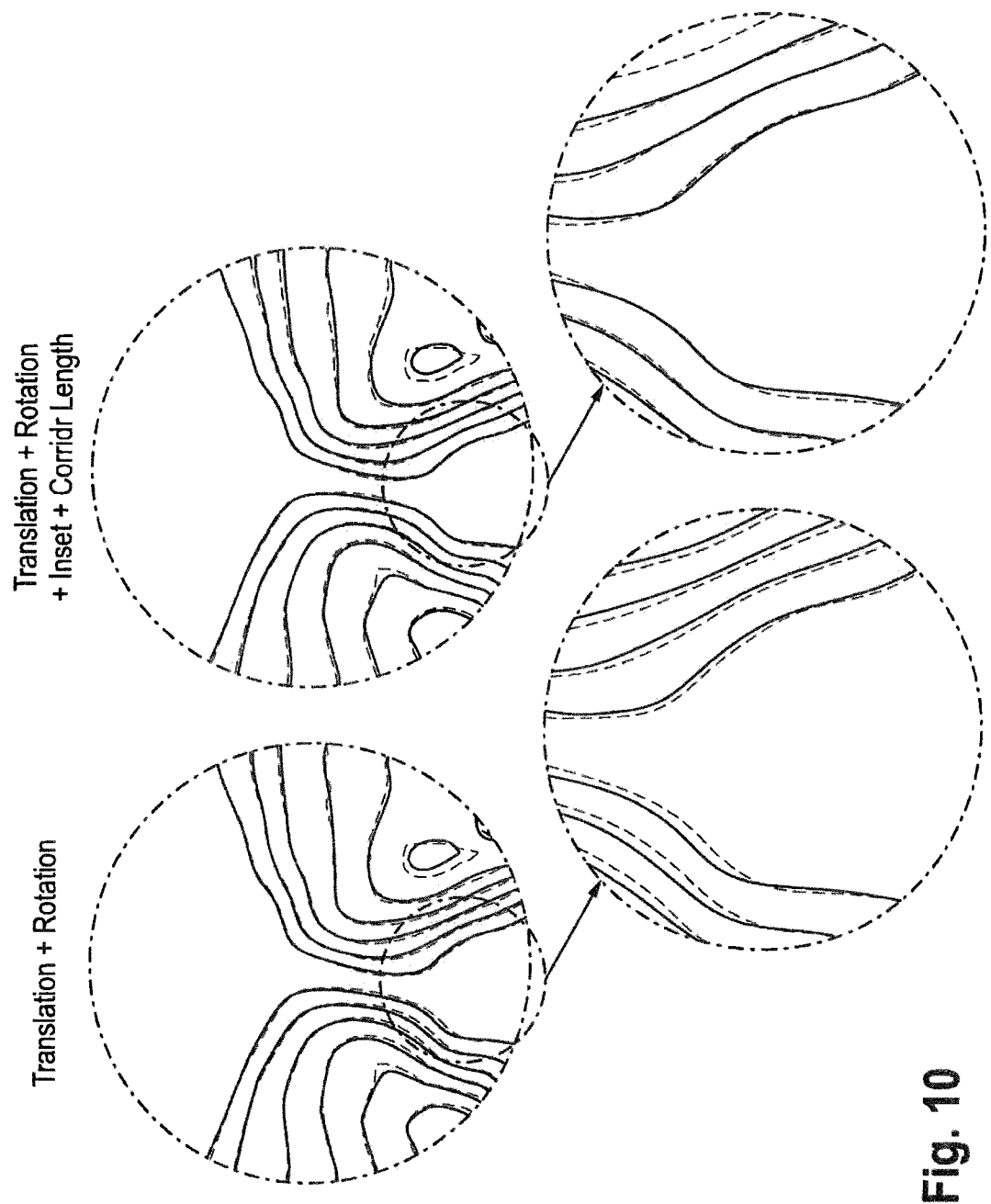
FIG. 10 shows an example of the application of the further embodiment of a method according to the invention.

Referring to FIG. 10, the next level of complexity requires adjustments to the lens that cannot be made after the lens is designed, but are controlled by parameters that are implemented in the initial design of the progressive spectacle lens. Two example parameters control the shape of the eye-path; the corridor length and inset. The next plots show an example where the apparent length of the corridor was stretched by 0.54 mm, considering only the astigmatic power error distribution. Additionally, since changing the length of the corridor moves the highest point with effective addition, there could also be used a metric that included the perceived mean power error distribution as well.

The perceived plot on the left was adjusted by applying a translation and rotation only. The plots on the right include the 0.54 mm lengthening of the corridor a trivial 0.03 shift in the inset. The zoomed regions highlight the differences, and improved correspondence due to the extra corridor modification.

Figure 11:
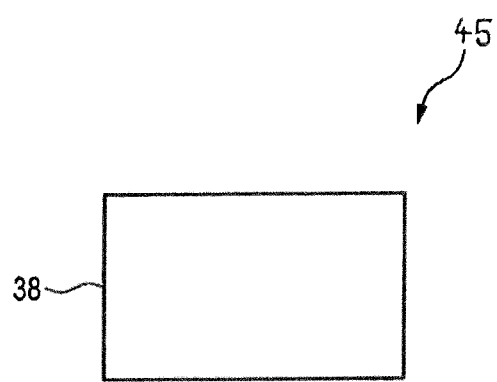
FIG. 11 shows a computer program according to the invention.

FIG. 11 shows a non-transitory computer program 45 comprising program code configured to execute a method according to any of the methods disclosed in connection with FIG. 7 or 9 or one of their refinements, when the computer program is run on a data processing device or processing unit 44.

Figure 12:
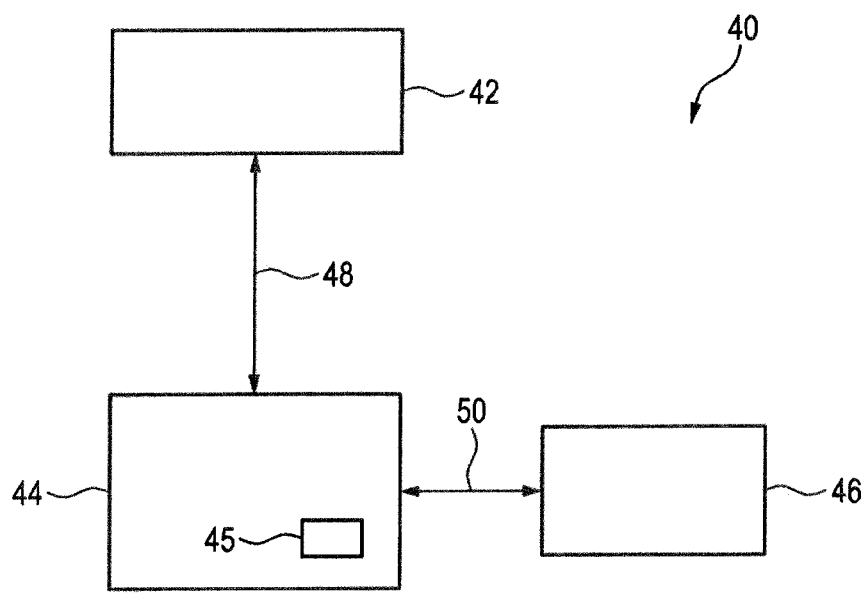
FIG. 12 shows an embodiment of a system according to the invention.

FIG. 12 shows a further embodiment of the system 40 according to the current invention. The optical wavefront aberration of a patient's eye of the wavefront aberration can be determined via an aberrometer 42. Further, a subjective refraction may also be determinable. The determination of the improved design is then conducted on the processing unit 44. The processing unit 44 may comprise the computer program 45 that stores executable program code to execute the methods explained above. Then, the system 40 may further comprise an output device 46 that may be a display, a printer or a storing device to output the determined improved design to the output device 46. The aberrometer 42 is connected to the processing unit 44 via a line 48. The processing unit 44 is connected to the output device 46 via a line 50. Both lines 48 and 50 may each be a wired connection or a wireless connection for data transfer between the processing unit 44 from and to the aberrometer 42 and the output device 46.

By this, the system 40 is able to automatically determine an improved design based on data provided via an aberrometer. However, instead of an aberrometer 42, the data underlying the determination may be also be acquired via the line 48 from a storing device that stores a multitude of patients' data acquired previously.

Figure 13:
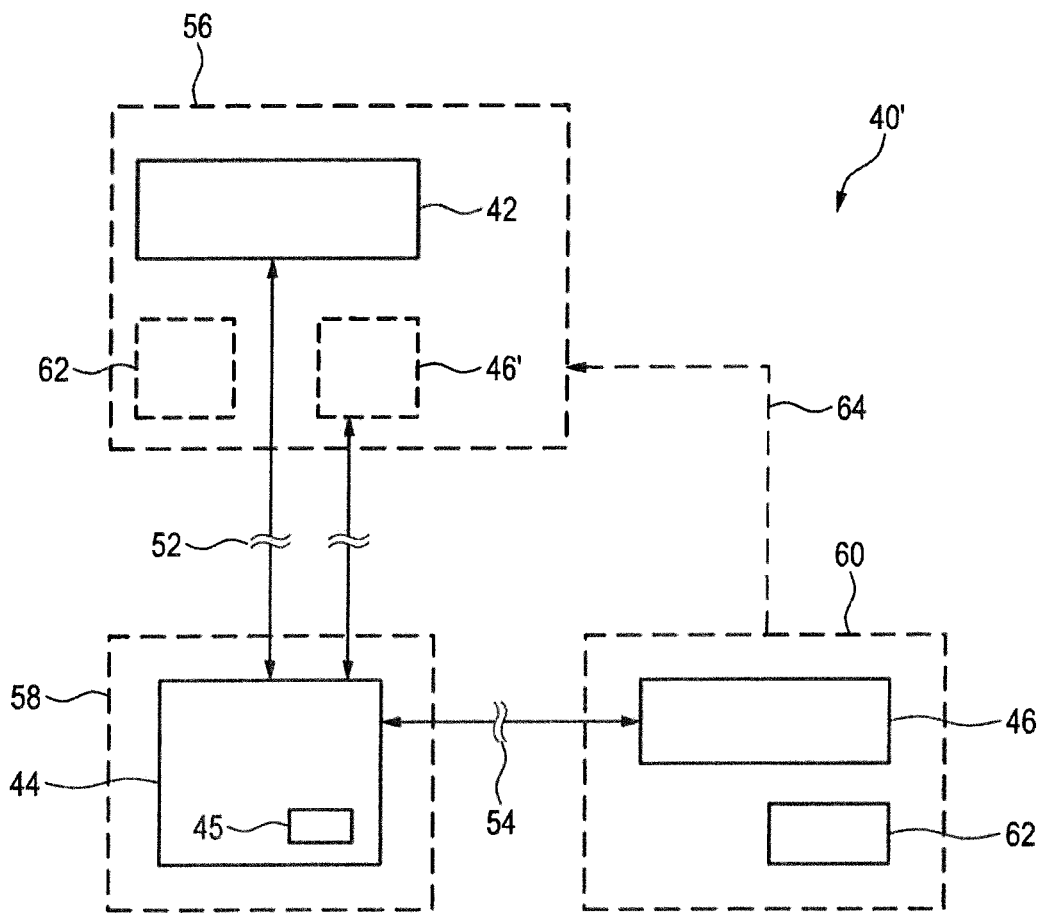
FIG. 13 shows a further embodiment of a system according to the invention.

In FIG. 13, a further embodiment of the system 40' is shown. The aberrometer 42 may be located at a first site 56. The processing unit 44 is located at a second site 58. The output device 46 may be located at a third site 60 or may be also located at the first site 56. Further, a manufacturing unit 62 from a manufacturing visual aid may be present at either the third site 60 or the first site 56.

The first site 56, the second site 58 and the third site 60 are remote from each other. The first site 56 is connected with the second site 58 via a data network 52. The second site 58 and the third site 60 are connected via a data network 54. By this, it may be possible that refraction data provided via the aberrometer 42 can be sent to the processing unit 44. Further, for example, the determined improved design may then be sent back to the first site, for example a spectacle shop, to be recognized by an ophthalmologist and provided to, for example, the possible wearer. Further, the improved design determined can be forwarded to a remote manufacturing unit to manufacture the respective lens. The manufacturing unit can be located at the first site 56. In this case, the data of the aberrometer is transmitted via connection 52 to the processing unit 44 at the second site 58 and then, the determined improved design is transferred back to the first site 56 and its possible manufacturing unit 62. Alternatively, from the second site 58, the determined eyeglass prescription can be transferred to a third site 60 with a possible manufacturing unit 62 to manufacture the visual aid. Last, it is possible that from this third site 60, the manufactured visual aid is then shipped to the first site 56 as indicated by the arrow 64.

A number of embodiments have been described. Other embodiments are in the claims.

In order to secure disclosure of the claims of the priority application the respective set of claims is herewith attached as clauses which are allowed and according to the decision J15/81 of the boards of appeal of the European Patent Office do not constitute claims:

Clause 1. A method (100, 200) for determining an improved design for a progressive lens (10), the method comprising the following steps:
  Obtaining (110, 210) an aberration information of an eye (30), the aberration information comprising lower order aberrations of the eye (30) and higher order aberrations of the eye (30), wherein the lower order aberrations are aberrations up to and including second order;
  Obtaining (120, 220) a design optical power distribution and a first design of the progressive lens (10), wherein the design optical power distribution is designed to correct for the lower order aberrations of the eye (30) and to provide for a desired addition power, and wherein the first design of the progressive lens (10) is determined to provide for the design optical power distribution based on a model of the aberrations of the eye (30), wherein the model includes aberrations only up to and including second order;
  Determining (130, 230) a perceived optical power distribution perceived by the eye (30) based on the first design of the progressive lens (10), the lower order aberrations of the eye (30) and the higher order aberrations of the eye (30);
  Determining (140, 240) a translation of the first design of the progressive lens (10) and a rotation of the first design of the progressive lens (10), such that a deviation between the perceived optical power distribution and the design optical power distribution is minimized; and
  Determining (150, 270) the improved design of the progressive lens (10) by translating and rotating the first design of the progressive lens (10) according to the determined translation and rotation.

Clause 2. The method according to clause 1, characterized in that the method further comprises:
  Determining a multitude of points, wherein the design optical power distribution comprises a design optical power in each of the multitude of points;
    Determining the perceived optical power distribution by determining, at least in each of the multitude of points, a perceived optical power perceived by the eye (30) based on the first design of the progressive lens (10); and
    wherein the deviation is minimized by determining the translation and the rotation such that a total sum of the magnitudes of the differences between the perceived optical powers and the design optical powers in the multitude of points is minimized.

Clause 3. The method according to clause 1 or 2, characterized in that the perceived optical power and the design optical power in each point is a perceived astigmatic error and a design astigmatic error, respectively.

Clause 4. The method according to any of clauses 1 to 3, characterized in that the step of determining (150, 270) the translation and the rotation comprises establishing an optimization space including possible translations and rotations and minimizing the deviation, and wherein the optimization space comprises ranges for the possible translations and rotations, wherein a range for each translation is a magnitude of the translation of 1.5 mm or less, and a range of the rotation is a magnitude of an angle of 1.5 degrees or less.

Clause 5. The method according to any of clauses 1 to 4, characterized in that obtaining the first design comprises:
  Determining the design optical power distribution by determining a prescription correcting for the lower order aberrations of the eye (30) and determining the design optical power distribution based on the prescription and the desired addition power based on a model of the aberrations of the eye (30), wherein the model includes aberrations only up to and including second order, wherein the prescription comprises at least one of a spherical power, a cylindrical power and a cylinder axis;
  Determining the first design of the progressive lens (10) based on the design optical power distribution based on a model of the aberrations of the eye (30), wherein the model includes aberrations only up to and including second order, wherein the first design of the progressive lens (10) comprises a lens shape (10) and fitting parameters providing for the design optical power distribution.

Clause 6. The method according to any of clauses 1 to 5, characterized in that the multitude of points has a number of at least 8.

Clause 7. The method according to any of clauses 1 to 6, characterized in that the design optical power distribution comprises a line indicating a design astigmatic error of 0.5 diopters, and wherein each of the multitude of points is on the line indicating the design astigmatic error of 0.5 diopters.

Clause 8. The method according to any of clauses 1 to 7, characterized in that a center of the rotation is set to a geometrical center of the design of the progressive lens (10).

Clause 9. The method according to any of clauses 1 to 7, characterized in that a center of the rotation is set to a middle of an intermediate corridor of the first design of the progressive lens (10).

Clause 10.
  The method according to clauses 1 or 2 or any of clauses 4 to 7 referring back to clause 1 or 2, characterized in that the first design of the progressive lens (10) comprises a set of progressive design parameters, and wherein the method further comprises iteratively repeating the steps to determine the improved design of the progressive lens (10) and optimizing the set of progressive design parameters such that the deviation between the perceived optical power distribution and the design optical power distribution is further minimized.

Clause 11.
  The method according to clause 10, characterized in that the set of progressive design parameters comprises at least one of an inset (26), a length of an intermediate corridor and a maximum gradient of spherical power.

Clause 12. The method according to clause 10 or 11, characterized in that the optimization of the set of progressive design parameters is conducted by establishing an optimization space comprising the set of progressive design parameters and, in each step of the optimization, determining a new first design based on a new set of progressive design parameters and, based on that new first design, determining a new improved design.

Clause 13. The method according to any of clauses 1 to 9, characterized in that the step of determining the improved design of the progressive lens (10) comprises only translating and rotating the first design of the progressive lens (10).

Clause 14. The method according to any of clauses 1 to 13, characterized in that the higher order aberrations only comprise aberrations of third and/or fourth order.

Clause 15. The method according to any of clauses 1 to 14, characterized in that each optimization is conducted by a least square optimization.

Clause 16. The method according to any of clauses 1 to 15, characterized in that the method is a computer-implemented method.

Clause 17. The method according to any of clauses 1 to 16, characterized in that the aberration information of the eye (30) is a wavefront measurement.

Clause 18. The method according to any of clauses 1 to 17, characterized in that the translation and the rotation of the first design of the progressive lens (10) is determined in a plane oblique or perpendicular to a distance direction (28) between the first design of the progressive lens (10) and the eye (30).

Clause 19. A method for manufacturing a progressive lens (10), the method comprising the following steps:
Determining a design of the progressive lens (10) according to a method of any of clauses 1 to 18; and
Manufacturing the progressive lens (10) with the determined design.

Clause 20. A system for determining an improved design for a progressive lens (10), comprising a processing unit configured to execute a method according to any of clauses 1 to 19.

Clause 21. A non-transitory computer program product comprising program code configured to execute a method according to any of clauses 1 to 19, when the computer program product is run on a data processing device.

Clause 22. A progressive lens (10) element manufactured according to the manufacturing method of clause 19.

It is understood that the foregoing description is that of the preferred embodiments of the invention and that various changes and modifications may be made thereto without departing from the spirit and scope of the invention as defined in the appended claims.

What is claimed is:

1. A computer-implemented method for determining an improved design for a progressive spectacle lens, the method comprising the steps of:
a) inputting measured aberration information of a wearer's eye into the computer comprising a non-transitory computer readable medium (CRM), wherein the CRM comprises a program code stored on the CRM;
b) generating in the computer via the program code an aberration information map of the wearer's eye, the aberration information map comprising lower-order aberrations of the wearer's eye and higher-order aberrations of the wearer's eye, wherein the lower-order aberrations are aberrations up to and including second-order, wherein second-order aberrations vary as a function of the square of the distance of a center of the pupil of the wearer's eye;
c) generating in the computer via the program code an initial design optical power distribution map and a corresponding initial design of the progressive spectacle lens in the computer, wherein the initial design optical power distribution map and corresponding initial design are generated via the program code incorporating information pertaining to only the lower-order aberrations of the wearer's eye and the lower-order aberrations of the progressive spectacle lens, and wherein the program code is programmed to assume a predetermined position and orientation of said progressive spectacle lens in front of said wearer's eye as well as a predetermined model for the distances and positions in space for a plurality of objects in front of the wearer's eye viewed by the wearer;
d) generating in the computer via the program code a perceived optical power distribution map indicative of theoretical power distribution perceived by the wearer's eye based on the initial design of the progressive spectacle lens, wherein the program code incorporates information pertaining to the lower-order aberrations and the higher-order aberrations of the wearer's eye of step b) as well as the lower-order aberrations and the higher-order aberrations of the progressive spectacle lens, and wherein the program code is programmed to assume said predetermined position and orientation of said progressive spectacle lens in front of said wearer's eye as well as said predetermined model for the distances and positions in space for a plurality of objects in front of the wearer's eye viewed by the wearer of step c);
e) generating in the computer via the program code an improved design optical power distribution map, wherein the program code translates the initial design optical power distribution map of the progressive spectacle lens of step c) and/or rotates the initial design optical power distribution map of the progressive spectacle lens of step c), such that a deviation between the perceived optical power distribution map of step d) and the translated and/or rotated initial design optical power distribution map is minimized;
f) generating in the computer via the program code the improved design of the progressive spectacle lens by at least one of:
translating and/or rotating the initial design of the progressive spectacle lens of step c) according to the translation and/or rotation determined in step e),
generating a starting design of the progressive spectacle lens that minimizes the aberrations based on the improved design optical power distribution map of step e) as a target design optical power distribution,
g) storing the improved design of the progressive spectacle lens onto an output device; and
h) transmitting the stored improved design of the progressive spectacle lens to a manufacturing unit.

2. The method of claim 1, wherein the lower-order aberrations and the higher-order aberrations of the progressive spectacle lens are expressed as Zernike polynomials.

3. A computer-implemented method for determining an improved design for a progressive spectacle lens, the method comprising the steps of:
a) inputting measured aberration information of a wearer's eye into the computer comprising a non-transitory computer readable medium (CRM), wherein the CRM comprises a program code stored on the CRM;

b) generating in the computer via the program code an aberration information map of the wearer's eye, the aberration information map comprising lower-order aberrations of the wearer's eye and higher-order aberrations of the wearer's eye, wherein the lower-order aberrations are aberrations up to and including second-order, wherein second-order aberrations vary as a function of the square of the distance of a center of the pupil of the wearer's eye;

c) generating in the computer via the program code an initial design optical power distribution map and a corresponding initial design of the progressive spectacle lens in the computer, wherein the initial design optical power distribution map and corresponding initial design are generated via the program code incorporating information pertaining to only the lower-order aberrations of the wearer's eye and the lower-order aberrations of the progressive spectacle lens, and wherein the program code is programmed to assume a predetermined position and orientation of said progressive spectacle lens in front of said wearer's eye as well as a predetermined model for the distances and positions in space for a plurality of objects in front of the wearer's eye viewed by the wearer;

d) generating in the computer via the program code a perceived optical power distribution map indicative of theoretical power distribution perceived by the wearer's eye based on the initial design of the progressive spectacle lens, wherein the program code incorporates information pertaining to the lower-order aberrations and the higher-order aberrations of the wearer's eye of step b) as well as the lower-order aberrations and the higher-order aberrations of the progressive spectacle lens, and wherein the program code is programmed to assume said predetermined position and orientation of said progressive spectacle lens in front of said wearer's eye as well as said predetermined model for the distances and positions in space for a plurality of objects in front of the wearer's eye viewed by the wearer of step c);

e) generating in the computer via the program code an improved design optical power distribution map, wherein the program code translates the initial design optical power distribution map of the progressive spectacle lens of step c) and/or rotates the initial design optical power distribution map of the progressive spectacle lens of step c), such that a deviation between the perceived optical power distribution map of step d) and the translated and/or rotated initial design optical power distribution map is minimized;

f) generating in the computer via the program code the improved design of the progressive spectacle lens by at least one of:
translating and/or rotating the initial design of the progressive spectacle lens of step c) according to the translation and/or rotation determined in step e),
generating a starting design of the progressive spectacle lens that minimizes the aberrations based on the improved design optical power distribution map of step e) as a target design optical power distribution, q) storing the improved design of the progressive spectacle lens onto an output device;

h) transmitting the stored improved design of the progressive spectacle lens to a manufacturing unit; and, wherein said step a) further comprises determining the measured aberration information of a wearer's eye with a wavefront aberrometer configured to measure a wavefront indicative of refractive properties of the wearer's eye.

4. A method for manufacturing a progressive spectacle lens, the method comprising the following steps:
determining an improved design of the progressive spectacle lens, wherein said determining an improved design of the progressive spectacle lens includes:

a) providing an aberration information of a wearer's eye, the aberration information comprising lower-order aberrations of the wearer's eye and higher-order aberrations of the wearer's eye, wherein the lower-order aberrations are aberrations up to and including second-order, wherein second-order aberrations vary as a function of the square of the distance of a center of the pupil of the wearer's eye;

b) providing an initial design optical power distribution and a corresponding initial design of the progressive spectacle lens, wherein the initial design optical power distribution and corresponding initial design are provided taking into consideration only the lower-order aberrations of the wearer's eye and the lower-order aberrations of the progressive spectacle lens and assuming a predetermined position and orientation of said progressive spectacle lens in front of said wearer's eye as well as a predetermined model for the distances and positions in space for a plurality of objects in front of the wearer's eye viewed by the wearer;

c) calculating a perceived optical power distribution perceived by the eye based on the initial design of the progressive spectacle lens and taking into consideration the lower-order aberrations and the higher-order aberrations of the wearer's eye of step a) as well as the lower-order aberrations and the higher-order aberrations of the progressive spectacle lens and assuming said predetermined position and orientation of said progressive spectacle lens in front of said wearer's eye as well as said predetermined model for the distances and positions in space for a plurality of objects in front of the wearer's eye viewed by the wearer of step b);

d) calculating an improved design optical power distribution by translating the initial design optical power distribution of the progressive spectacle lens of step b) and/or rotating the initial design optical power distribution of the progressive spectacle lens of step b), such that a deviation between the perceived optical power distribution of step c) and a translated and/or rotated initial design optical power distribution is minimized; and e) calculating the improved design of the progressive spectacle lens by at least one of:
translating and/or rotating the initial design of the progressive spectacle lens of step b) according to the calculated translation and/or rotation of step d) and
optimizing a starting design of the progressive spectacle lens by using the improved design optical power distribution of step d) as a target design optical power distribution; and,
manufacturing the progressive spectacle lens with the determined improved design.

5. The method of claim 4, wherein:
said perceived optical power distribution of step c) comprises a plurality of support points at each of which a corresponding optical power value and a corresponding weighting is defined, said calculating of step d) comprises translating and/or rotating said plurality of support points with its corresponding optical power values and its corresponding weightings according to the calculated translation and/or rotation, and said providing said initial design of the progressive spectacle lens of step b) comprises minimizing a cost- or merit-function comprising said corresponding optical power values as target optical power values and its corresponding weightings at each of said plurality of support points.

6. The method of claim 4, wherein at least one of the following conditions are considered in providing said initial design of the progressive spectacle lens:

individual optical power values at far reference point and/or near reference point for right and left eye, cornea-vertex distance, different required characteristic magnification for right and left eye, forward inclination of frame, form of frame, centering, pupillary distance, use condition, and different optical powers for right and left eye, with effects on an equalization of prismatic side-effects.

7. The method of claim 4, further comprising:

calculating the perceived optical power distribution by determining, at least in each of the multitude of points, a perceived optical power perceived by the eye based on the initial design of the progressive spectacle lens; and wherein the deviation is minimized by determining the translation and/or the rotation such that a total sum of the magnitudes of the differences between the perceived optical powers and the initial design optical powers in the multitude of points is minimized.

8. The method of claim 4, wherein the perceived optical power distribution and the initial design optical power distribution in each point or at least one point is at least one of:

a perceived astigmatic error and an initial design astigmatic error, respectively, a perceived axis of a perceived astigmatic error and an initial design axis of an initial design astigmatic error, respectively, a perceived spherical error and an initial design spherical error, respectively, a perceived prismatic error and an initial design prismatic error, respectively, and a perceived base of a perceived prismatic error and an initial base of a perceived prismatic error.

9. The method of claim 4, wherein the step of generating an improved design optical power distribution by translating and/or rotating comprises establishing an optimization space including possible translations and/or rotations and minimizing the deviation, wherein the optimization space comprises ranges for the possible translations and/or rotations, and wherein a range for each translation is a magnitude of the translation of 1.5 mm or less, and/or a range of the rotation is a magnitude of an angle of 1.5 degrees or less.

10. The method of claim 4, wherein the providing the initial design optical power distribution comprises:

providing the initial design optical power distribution by generating a prescription correcting for the lower-order aberrations of the eye and generating the initial design optical power distribution based on the prescription and a desired addition power based on a model of the aberrations of the eye generated by the program code, wherein the model includes aberrations only up to and including second-order, and wherein the prescription comprises at least one of a spherical power, a cylindrical power and a cylinder axis, and a prismatic power and a prismatic base; and, calculating the initial design optical power distribution of the progressive spectacle lens based on the initial design optical power distribution, which itself is based on a model of the aberrations of said wearer's eye, wherein the model includes aberrations only up to and including second-order, and wherein the initial design of the progressive spectacle lens comprises a lens shape and fitting parameters providing for the initial design optical power distribution.

11. The method of claim 4, wherein a center of the rotation is set to at least one of:

a geometrical center of the design of the progressive spectacle lens, and a middle of an intermediate corridor of the initial design of the progressive spectacle lens.

12. The method of claim 4, wherein the initial design optical power distribution of the progressive spectacle lens comprises a set of progressive spectacle lens design parameters inputted into a computer, and wherein the method further comprises iteratively repeating the steps to generate the improved design optical power distribution of the progressive spectacle lens and optimizing the set of progressive design parameters such that a deviation between the perceived optical power distribution and the initial design optical power distribution is further minimized.

13. The method of claim 12, wherein the set of progressive spectacle lens design parameters comprises at least one of an inset, a length of an intermediate corridor and a maximum gradient of spherical power.

14. The method of claim 12, wherein the optimization of the set of progressive spectacle lens design parameters is conducted by establishing an optimization space comprising the set of progressive spectacle lens design parameters and, in each step of the optimization, determining a new initial design based on a new set of progressive spectacle lens design parameters and, based on that new initial design, determining a new improved design.

15. The method of claim 4, wherein the step of generating the improved design optical power distribution of the progressive spectacle lens comprises only translating and/or rotating the initial design optical power distribution of the progressive spectacle lens.

16. The method of claim 4, wherein the higher-order aberrations only comprise aberrations of third and/or fourth order.

17. The method of claim 4, wherein each optimization of step e) is conducted by a least square optimization.

18. The method of claim 4, wherein the aberration information of the wearer's eye is a wavefront measurement.

19. The method of claim 4, wherein the translation and/or the rotation of the initial design of the progressive spectacle lens is determined in a plane oblique or perpendicular to a distance direction between the initial design of the progressive spectacle lens and the eye.

20. A system for determining an improved design for a progressive spectacle lens, comprising:
a processing unit configured to:
a) provide an aberration information of a wearer's eye, the aberration information comprising lower-order aberrations of the wearer's eye and higher-order aberrations of the wearer's eye, wherein the lower-order aberrations are aberrations up to and including second-order, wherein second-order aberrations vary as a function of the square of the distance of a center of the pupil of the wearer's eye;
b) provide an initial design optical power distribution and a corresponding initial design of the progressive spectacle lens, wherein the initial design optical power distribution and corresponding initial design are provided taking into consideration only the lower-order aberrations of the wearer's eye and the lower-order aberrations of the progressive spectacle lens and assuming a predetermined position and orientation of said progressive spectacle lens in front of said wearer's eye as well as a predetermined model for the distances and positions in space for a plurality of objects in front of the wearer's eye viewed by the wearer;
c) calculate a perceived optical power distribution perceived by the eye based on the initial design of the progressive spectacle lens and taking into consideration the lower-order aberrations and the higher-order aberrations of the wearer's eye of step a) as well as the lower-order aberrations and the higher-order aberrations of the progressive spectacle lens and assuming said predetermined position and orientation of said progressive spectacle lens in front of said wearer's eye as well as said predetermined model for the distances and positions in space for a plurality of objects in front of the wearer's eye viewed by the wearer of step b);
d) calculate an improved design optical power distribution by translating the initial design optical power distribution of the progressive spectacle lens of step b) and/or rotating the initial design optical power distribution of the progressive spectacle lens of step b), such that a deviation between the perceived optical power distribution of step c) and a translated and/or rotated initial design optical power distribution is minimized; and
e) calculate the improved design of the progressive spectacle lens by at least one of:
translating and/or rotating the initial design of the progressive spectacle lens of step b) according to the calculated translation and/or rotation of step d) and
optimizing a starting design of the progressive spectacle lens by using the improved design optical power distribution of step d) as a target design optical power distribution.

21. A non-transitory computer readable medium (CRM) having a computer program comprising:
a program code stored on the non-transitory computer readable medium (CRM) and configured, when executed by a computer, to:
a) provide an aberration information of a wearer's eye, the aberration information comprising lower-order aberrations of the wearer's eye and higher-order aberrations of the wearer's eye, wherein the lower-order aberrations are aberrations up to and including second-order, wherein second-order aberrations vary as a function of the square of the distance of a center of the pupil of the wearer's eye;
b) provide an initial design optical power distribution and a corresponding initial design of the progressive spectacle lens, wherein the initial design optical power distribution and corresponding initial design are provided taking into consideration only the lower-order aberrations of the wearer's eye and the lower-order aberrations of the progressive spectacle lens and assuming a predetermined position and orientation of said progressive spectacle lens in front of said wearer's eye as well as a predetermined model for the distances and positions in space for a plurality of objects in front of the wearer's eye viewed by the wearer;
c) calculate a perceived optical power distribution perceived by the eye based on the initial design of the progressive spectacle lens and taking into consideration the lower-order aberrations and the higher-order aberrations of the wearer's eye of step a) as well as the lower-order aberrations and the higher-order aberrations of the progressive spectacle lens and assuming said predetermined position and orientation of said progressive spectacle lens in front of said wearer's eye as well as said predetermined model for the distances and positions in space for a plurality of objects in front of the wearer's eye viewed by the wearer of step b);
d) calculate an improved design optical power distribution by translating the initial design optical power distribution of the progressive spectacle lens of step b) and/or rotating the initial design optical power distribution of the progressive spectacle lens of step b), such that a deviation between the perceived optical power distribution of step c) and a translated and/or rotated initial design optical power distribution is minimized; and
e) calculate the improved design of the progressive spectacle lens by at least one of:
translating and/or rotating the initial design of the progressive spectacle lens of step b) according to the calculated translation and/or rotation of step d) and
optimizing a starting design of the progressive spectacle lens by using the improved design optical power distribution of step d) as a target design optical power distribution.

* * * * *

UNITED STATES PATENT AND TRADEMARK OFFICE
CERTIFICATE OF CORRECTION

PATENT NO. : 10,969,607 B2
APPLICATION NO. : 16/259912
DATED : April 6, 2021
INVENTOR(S) : R. Spratt et al.

Page 1 of 1

It is certified that error appears in the above-identified patent and that said Letters Patent is hereby corrected as shown below:

On the Title Page

<u>On page 2</u>:
Item (56) Under OTHER PUBLICATIONS, second column, Line 10:
Delete "Thapters 3" and substitute -- Chapters 3 -- therefor.

In the Claims

<u>In Column 29</u>:
Line 64:
Delete "q)" and substitute -- g) -- therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*